United States Patent [19]

Sones

[11] Patent Number: 5,911,003
[45] Date of Patent: Jun. 8, 1999

[54] COLOR PATTERN EVALUATION SYSTEM FOR RANDOMLY ORIENTED ARTICLES

[75] Inventor: Richard A. Sones, Cleveland Heights, Ohio

[73] Assignee: Pressco Technology Inc., Solon, Ohio

[21] Appl. No.: 08/638,554

[22] Filed: Apr. 26, 1996

[51] Int. Cl.$^6$ ........................................... G06K 9/00
[52] U.S. Cl. ........................ 382/162; 382/165; 382/141; 382/143; 382/151
[58] Field of Search ..................... 382/165, 164, 382/170, 171, 175, 288, 289, 141, 143, 151, 278; 348/91–95; 356/402, 394, 237; 209/587, 580, 581, 577, 576, 938, 939; 358/504, 518, 515, 523

[56] References Cited

U.S. PATENT DOCUMENTS

| | | | |
|---|---|---|---|
| 4,082,188 | 4/1978 | Grimmell et al. | 209/73 |
| 4,110,826 | 8/1978 | Mollgaard et al. | 364/526 |
| 4,194,839 | 3/1980 | Knop | 356/407 |
| 4,241,835 | 12/1980 | Lockett | 209/582 |
| 4,260,062 | 4/1981 | Lockett | 209/582 |
| 4,345,312 | 8/1982 | Yasuye et al. | 382/151 |
| 4,349,279 | 9/1982 | Jung | 356/402 |
| 4,414,635 | 11/1983 | Gast et al. | 364/526 |
| 4,462,046 | 7/1984 | Spight | 382/141 |
| 4,488,245 | 12/1984 | Dalke et al. | 364/526 |
| 4,493,420 | 1/1985 | Dennis | 209/587 |
| 4,631,750 | 12/1986 | Gabriel et al. | 382/41 |
| 4,731,860 | 3/1988 | Wahl | 382/141 |
| 4,790,022 | 12/1988 | Dennis | 382/8 |
| 4,805,224 | 2/1989 | Koezuka et al. | 382/141 |
| 4,812,904 | 3/1989 | Maring et al. | 358/107 |
| 4,991,223 | 2/1991 | Bradley | 382/17 |
| 4,992,949 | 2/1991 | Arden | 364/478 |
| 5,085,325 | 2/1992 | Jones et al. | 209/580 |
| 5,120,126 | 6/1992 | Wertz et al. | 356/71 |
| 5,179,598 | 1/1993 | DiFoggio et al. | 382/48 |
| 5,245,399 | 9/1993 | Wertz et al. | 356/237 |
| 5,335,293 | 8/1994 | Vannelli et al. | 382/17 |
| 5,339,963 | 8/1994 | Tao | 209/581 |
| 5,353,358 | 10/1994 | Baird et al. | 382/141 |
| 5,374,988 | 12/1994 | Wertz et al. | 356/328 |
| 5,446,543 | 8/1995 | Nakagawa et al. | 356/405 |
| 5,493,404 | 2/1996 | Allaire et al. | 356/402 |

OTHER PUBLICATIONS

Hance et al., "Unsupervised Color Image Segmentation—With Application to Skin Tumor Borders," *IEEE Engineering in Medicine and Biology*, Jan./Feb. 1996, pp. 104–111.

*Primary Examiner*—Edward L. Coles
*Assistant Examiner*—Cheukfan Lee
*Attorney, Agent, or Firm*—Fay, Sharpe, Beall, Fagan, Minnich & McKee

[57] ABSTRACT

An imaging device coupled to a processor generates a number of image signals corresponding to a multicolor pattern of an item in motion. Each of a number of regions of the pattern is correlated to one of a number of reference colors to generate a segmented image of the pattern. The processor models the multicolor pattern by deriving a number of test values from the segmented image representation. Each test value is representative of a corresponding one of the regions and is determined as a function of region size independent of orientation of the multicolor pattern. The test values are compared to reference data to detect a variation of the item. The reference colors may be determined from color pairs with each pair having a first member from a first set of sample colors and a second member from a second set of sample colors. The first member is closer to the second member than any other color of the second set in the color space, and the second member is closer to the first member than any other color of the first set in the color space. An image of the item randomly oriented with respect to a model image is characterized by generating a number of characteristic values within the processor with respect to rotational position about an item image point. A rotationally correlated item image is generated as a function of the characteristic values for evaluation.

40 Claims, 12 Drawing Sheets

COLUMNS  
ROWS  
$N_p' = 5$

|   | 1 | 2 | 3 | 4 | 5 |
|---|---|---|---|---|---|
| 1 | 2 | 1 | 2 | 2 | 3 |
| 2 | 1 | 2 | 2 | 2 | 2 |
| 3 | 2 | 2 | 1 | 2 | 4 |
| 4 | 6 | 6 | 6 | 5 | 4 |

COLUMNS  
ROWS  
$N_p' = 5$

|   | 1 | 2 | 3 | 4 | 5 |
|---|---|---|---|---|---|
| 1 | 0 | 1 | 0 | 0 | 0 |
| 2 | 1 | 0 | 0 | 0 | 0 |
| 3 | 0 | 0 | 1 | 0 | 0 |
| 4 | 0 | 0 | 0 | 0 | 0 |

COLOR PATTERN EVALUATION SYSTEM FOR RANDOMLY ORIENTED ARTICLES

BACKGROUND OF THE INVENTION

The present invention relates to image processing, and more particularly relates to image processing systems for the inspection of items decorated with a multicolored pattern.

Several systems have been proposed to determine quality of a color decoration of an item. Some of these systems use an electronic image processor to evaluate coloration as part of an assembly line process. Typically, these systems employ an array of optical sensors to generate a pixelated image of the item for analysis by the processor. One problem with this approach is that the decoration is usually randomly oriented with respect to the optical sensors, making electronic image evaluation difficult.

One attempt to overcome this problem is to transform the physical space image of the object undergoing inspection into a color space representation. This color space representation is typically independent of physical space orientation of the object. U.S. Pat. Nos. 5,120,126 to Wertz et al., 5,374,988 to Wertz et al., and 5,339,963 to Tao are cited as sources of general information concerning color space applications to inspection and sorting systems.

FIG. 1A provides a perspective view of color space defined in terms of Red, Green, Blue (RGB) coordinates. This form of color space is convenient for characterizing colors of images supplied by the RGB output of many types of cameras. Another color space representation is presented in FIG. 1B in terms of the Hue, Saturation, Intensity (HSI) color space coordinates. Methods to convert between RGB and HSI color space image representations are well known. The "Line of Grays" common to both FIGS. 1A and 1B indicates the nature of this conversion. Notably, color space could also be defined in terms of the Yellow, Cyan, Magenta (YCM) color space coordinate triad or some other triad of coordinates as would occur to one skilled in the art. Furthermore, a two dimensional color space may be defined in terms of two independent coordinates of a three coordinate system.

One type of color image evaluation process, which typically utilizes color space transformations, partitions a color image into uniformly colored regions using a process commonly called "segmentation." The resulting "segmented image" looks like a stained glass portrayal or a comic strip cartoon of the item. The uniform color regions are generally determined by correlating each color of the actual image to the closest color in a set of reference colors. There are usually significantly fewer colors in the reference color set than are initially presented in the actual image. Segmentation typically eliminates gradual color changes, reflection differences, and other minor variations that may hamper image processing. Furthermore, segmentation generally simplifies the evaluation process by reducing the part image to a pre-defined number of known reference colors. For segmentation systems where the actual image is provided in a pixelated format, each region is typically correlated by addressing a segmentation look-up table with each pixel color value. These systems output a common reference color for a selected range of pixel color values to provide a corresponding segmented image. U.S. Pat. Nos. 4,414,635 to Gast et al. and 5,335,293 to Vannelli et al. are cited generally as sources of additional information concerning segmentation.

Although typically free from the random orientation problem, color space inspection systems frequently suffer from being unable to cost effectively indicate the nature of a detected variation in a multicolor pattern for subsequent confirmation by an operator. Also, the detection of pattern variations, deviations, or defects often requires complex processing equipment and a significant amount of processing time. Unfortunately, these systems may even become the principle limiting factor for the speed of an assembly line. Thus, a need remains for faster and more reliable evaluation of color decorations on items moving on a conveyor.

SUMMARY OF THE INVENTION

One feature of the present invention is inspecting a multicolor pattern on an item with a processor and an imaging device. The imaging device generates a number of image signals corresponding to the multicolor pattern while the item is in motion. With the processor, each of a number of regions of the multicolor pattern is correlated to one of a number of reference color values using the image signals. The processor models the multicolor pattern by deriving a number of test value sets. Each set corresponds to one of the regions and is independent of orientation of the multicolor pattern. Each set has at least a first value representative of a first characteristic of a corresponding region and a second value representative of a second characteristic of the corresponding region. The sets are compared to reference data with the processor to detect variation of the multicolor pattern.

Another feature of the present invention is to inspect an item with an imaging device and a processor that includes conveying the item by the imaging device to provide an item image which is randomly oriented with respect to orientation of a model image of the item. The item image is characterized by generating a number of characteristic values within the processor. Each characteristic value corresponds to one of a number of rotational positions about an item image point and is determined as a function of an optical property of a portion of the item image corresponding to each of the rotational positions. The item image is rotationally correlated to the model image as a function of the characteristic values. The item image is compared to the model image to evaluate the item after rotational correlation.

Still another feature of the present invention is inspecting a multicolor pattern on an item with a processor by establishing a first set of color values with the processor as a function of a number of color space coordinates. The processor determines a second set of color values from a sample as a function of the coordinates. A number of reference colors are generated with each being determined from a corresponding one of a number of color pairs. Each pair has a first member from the first set and a second member from the second set with the first member being closer in color space to the second member than any other color of the second set and the second member being closer in color space to the first member than any other color of the first set. A number of detected color values corresponding to the multicolor pattern are compared to the reference color values with the processor to evaluate the multicolor pattern on the item. Among the advantages of this feature is the ability to eliminate inconsistent or spurious colors from the reference colors.

Accordingly, it is one object of the present invention to provide a model of a multicolor pattern on a item based on a segmented image of the pattern.

Another object of the present invention is to efficiently eliminate spurious colors from a reference color table within a processor which may be used to evaluate colored items.

Still another object of the present invention is to efficiently re-orient a randomly oriented image of an item for comparison to a model image.

Further objects, aspects, features, and advantages of the present invention will be apparent from the following discussion and drawings provided herein.

BRIEF DESCRIPTION OF THE DRAWINGS

FIG. 6D is an example of a color distance matrix of the type which may be used in performing the process of FIG. 4.

FIG. 6E is an example of a color matching matrix of the type which may be used in performing the process of FIG. 4.

DESCRIPTION OF THE PREFERRED EMBODIMENT

Figure 1A:
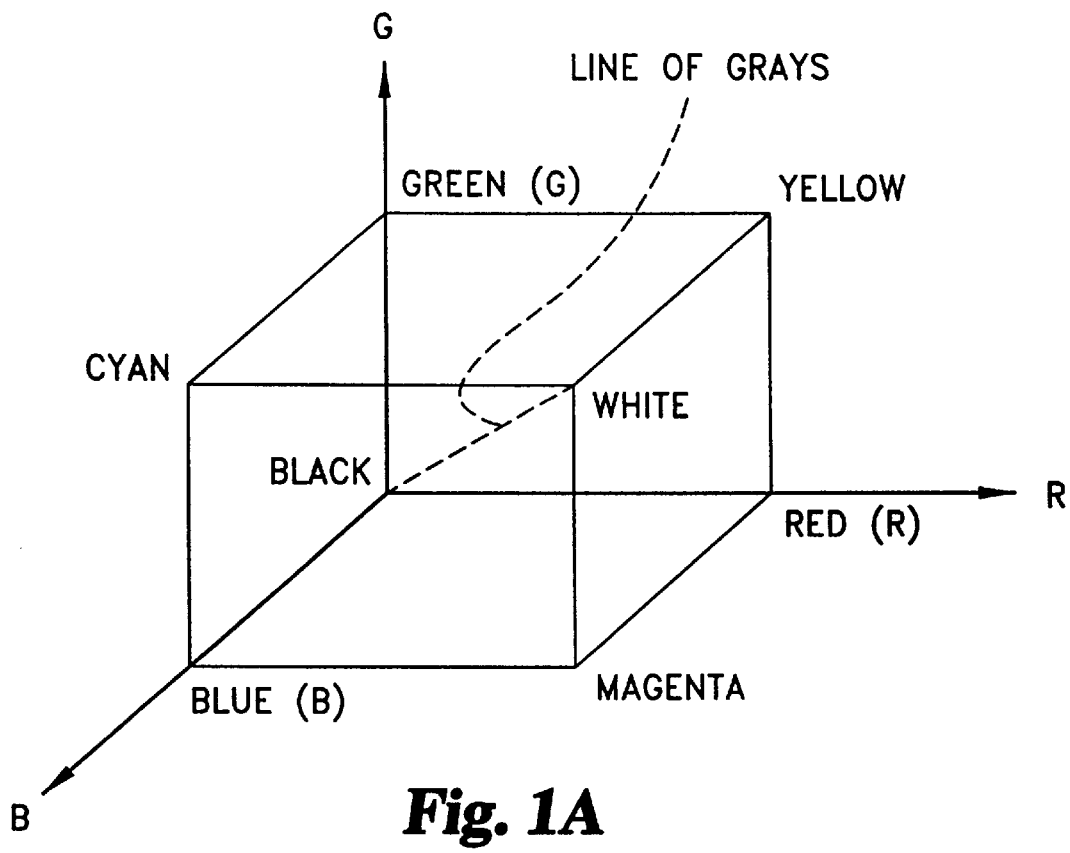
FIG. 1A is a graphic depiction of RGB color space.
Figure 1B:
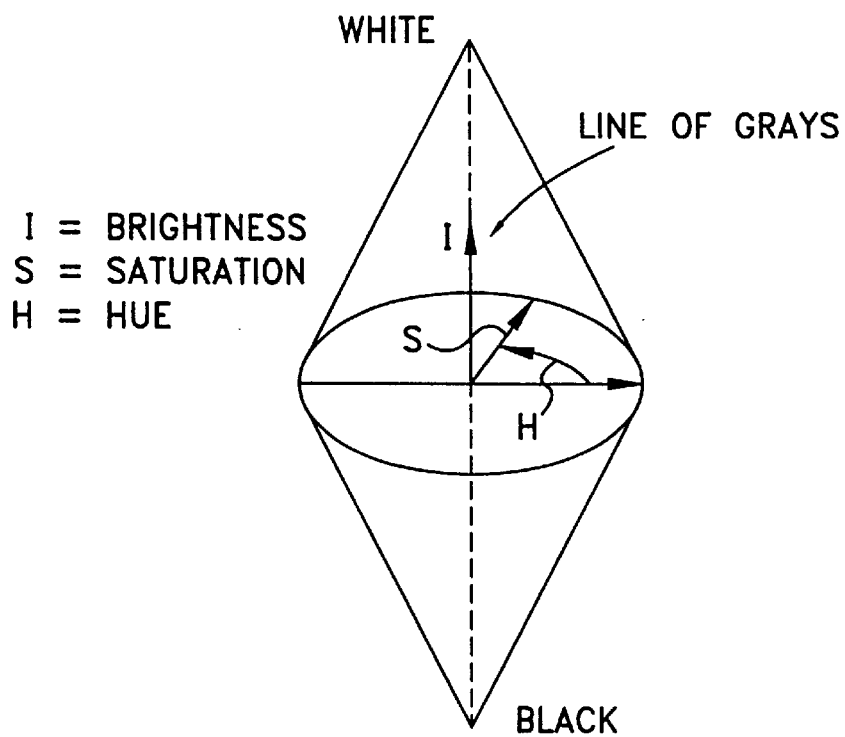
FIG. 1B is a graphic depiction of HSI color space.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein are contemplated as would normally occur to one skilled in the art to which the invention relates.

Figure 2:
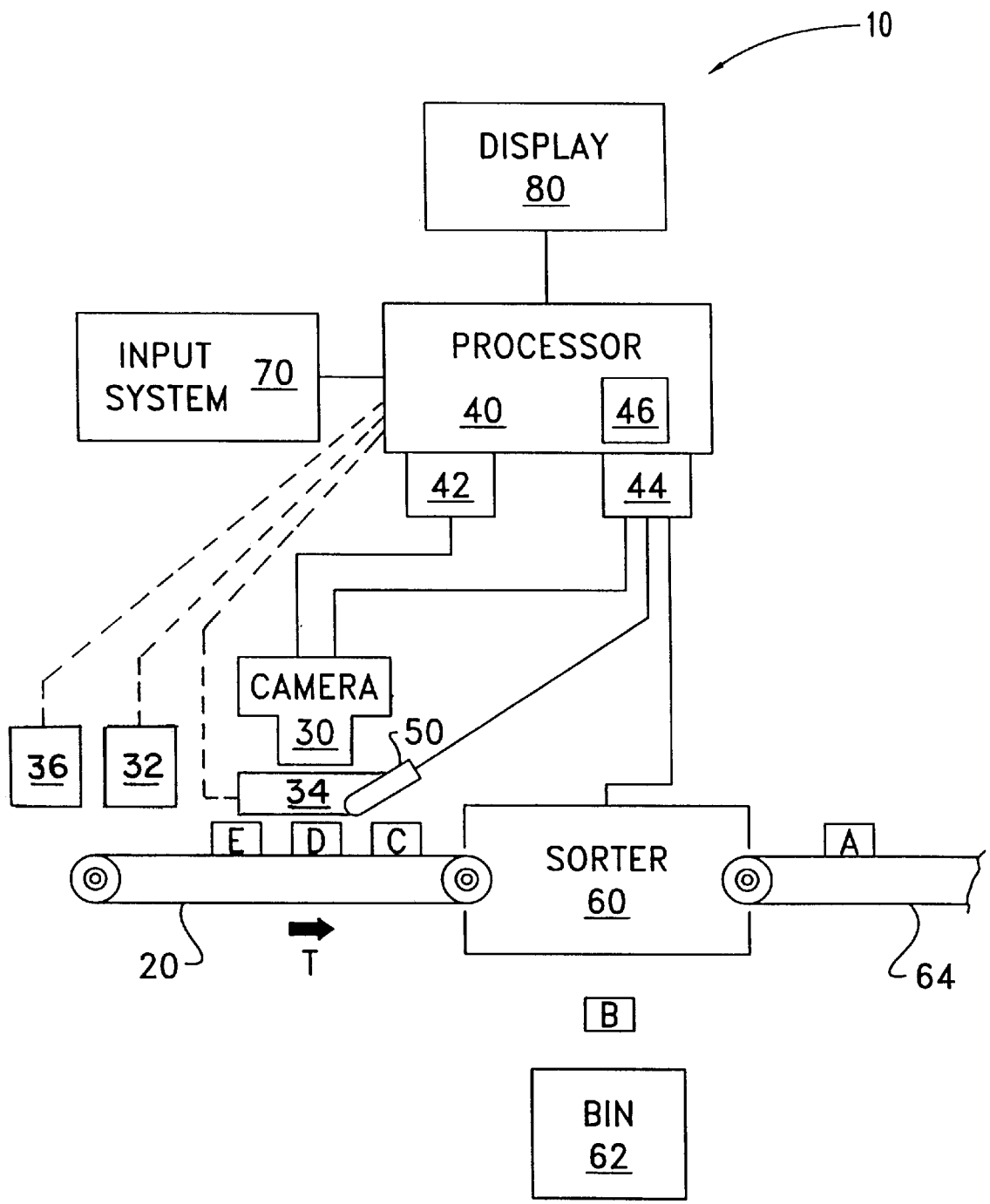
FIG. 2 is diagrammatic view of an inspection system of one embodiment of the present invention.

FIG. 2 depicts inspection system 10 of one embodiment of the present invention. System 10 includes conveyor 20 which transports a number parts A, B, C, D, E past camera 30 in the direction indicated by arrow T. Each part A–E is decorated with a multicolored pattern which may be randomly oriented with respect to a field of view of camera 30. Camera 30 is operatively coupled to processor 40 to provide image signals corresponding to the multicolored pattern of each part as it passes by the field of view. In the case of FIG. 2, part D is depicted in the field of view of camera 30. Processor 40 is configured to analyze image signals from camera 30 to determine variation of the corresponding multicolor pattern from expected parameters and respond to detected variation in a specified manner.

Processor 40 includes frame grabber 42 and interface 44 both operatively coupled to camera 30. Frame grabber 42 digitizes and stores image signals from camera 30 corresponding to an imaged item in the field of view of camera 30, such as part D. Frame grabber 42 provides the digitized image signals to processor 40 for further processing and evaluation.

Interface 44 is operatively coupled to part sensor 50. Part sensor 50 is of a conventional type which detects the presence of an object in the field of view of camera 30 and generates a corresponding part present signal. Processor 40 receives the part present signal and responds by sending a control signal to camera 30 to provide corresponding imaging signals to frame grabber 42 via interface 44.

In addition, interface 44 is operatively coupled to sorter 60 which is encountered by parts after they move by camera 30 on conveyor 20. Sorter 60 is an output device configured to respond to an output signal from processor 40 via interface 44 to route defective parts, such as part B illustrated, to bin 62. In contrast, acceptable parts, such as part A, depart from sorter 60 on conveyor 64. In alternative embodiments, a different type of sorter may be used or a sorter may not be utilized. U.S. Pat. Nos. 4,241,835 to Lockett, 4,790,022 to Dennis, 4,992,949 to Arden are generally cited as additional sources of information concerning color processing sorters which may be adapted for use with the present invention.

Processor 40 may be comprised of one or more electronic circuit components. Similarly, processor 40 may be comprised of digital circuitry, analog circuitry, fuzzy logic circuitry, or a combination thereof. Also, processor 40 may be programmable, an integrated state machine, or a combination of both. Preferably, processor 40 is a ruggedized industrial grade programmable personnel computer customized with suitable circuitry and software corresponding to frame grabber 42, interface 44, and various processing requirements. In one preferred configuration, processor 40 includes communication interfaces such as a modem or network link (not shown) and subsystems to accommodate removable media, such as compact disks, (CDs) or floppy disks (not shown).

Processor 40 includes memory 46. Memory 46 may be one or more components of the electronic (e.g. solid state), magnetic, optical, or other variety as would occur to those skilled in the art. Preferably, memory 46 includes a collection of electronic random access memory components (RAMs) and one or more hard disk drives.

Processor 40 is operatively coupled to input system 70 and display 80. Input system 70 provides a way for an operator to input commands and relevant data into processor 40. Input system 70 is preferably a keyboard and/or mouse arrangement, but alternatively may be a microphone input with associated voice recognition software, or such other device as would occur to one skilled in the art.

Display 80 is an output device responsive to processor 40 which prompts an operator to provide inputs via input system 70 and also selectively presents images of parts obtained via camera 30. Display 80 may also provide a visual indication of a defective part, and may furthermore indicate the defect on a displayed image of the part. Display 80 is preferably of the conventional color cathode ray tube variety readily available for integration with personal computers. Alternatively, a liquid crystal display or other visual display responsive to processor 40 may be used.

Camera 30 is a color video area camera with a charge-coupled device (CCD) sensor array capable of providing a 640×480 (640 column by 480 row) pixel frame matrix having two interlaced 640×240 pixel field matrices per frame. Preferably, camera 30 is a three chip camera with any gamma correction disabled (gamma correction typically compensates for non-linear voltage-to-intensity mapping of video monitors). Camera 30 employs a color signal format which has a separate channel corresponding to each of the three RGB color components, Red (R), Green (G), and Blue (B), and a separate channel for a synchronization (sync) signal.

Preferably the frame rate of camera 30 is about 30 Hz. A 30 Hz frame rate permits capturing of generally unblurred images of items moving on conveyor 20 at a rate of about 30 per second. One way to acquire an image of an object moving relative to camera 30 without motion blur, is by shuttering. Preferably, the control signal from processor 40 generated in response to a part-present signal from sensor 50 is used to shutter camera 30. A few examples of alternative shuttering approaches are electronic gating of a camera's CCD element photo-integration period, strobing an illumination source (representatively illustrated at 32), and using a dedicated mechanical device (representatively illustrated at 34). Camera 30 is preferably electronically gated. For this type of shuttering, constant illumination of the objects to be imaged is preferably provided by fluorescent tubes with a high frequency balance. Furthermore, the intensity of this illumination source is preferably stabilized by feedback from a photo sensor (representatively illustrated at 36) in the vicinity of the camera 30.

It should be understood that camera 30 has an interlaced 640×480 pixel frame so that only one of two 640×240 pixel fields is generally available at a 30 Hz image capture rate. The resulting 640×240 pixel image is distorted, appearing vertically compressed by a factor of one half. To compensate for this distortion, every other pixel of each row is discarded to provide an undistorted 320×240 pixel image.

Figure 3:
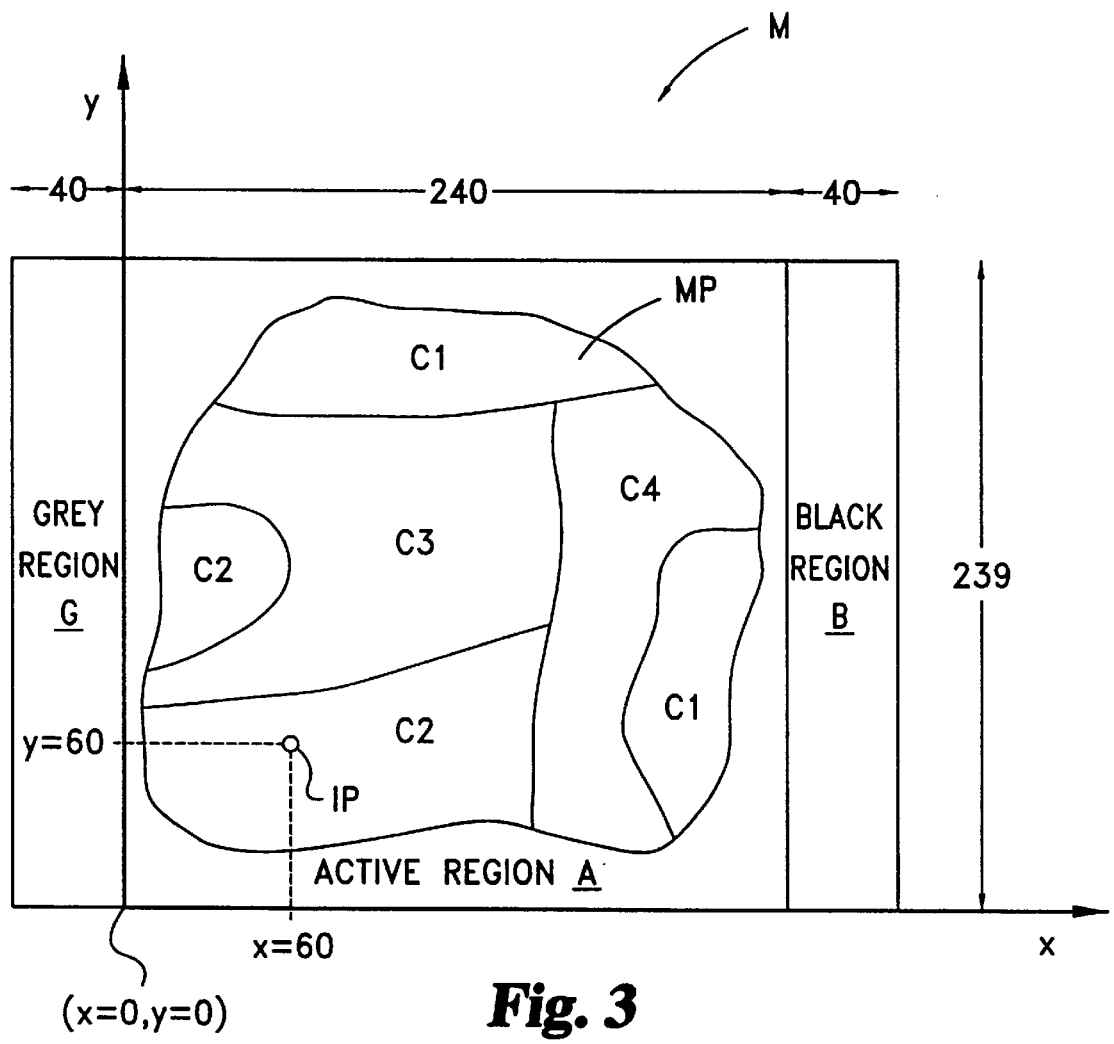
FIG. 3 is a diagram of an imaging area used in conjunction with the embodiment of FIG. 2.

Referring additionally to FIG. 3, a field image matrix M is illustrated. Matrix M corresponds to a 320×240 (320 column by 240 row) pixel image from camera 30 with the bottom row discarded because it is typically interrupted by a vertical retrace. Coordinate axes x,y are indicated to define a number of regions A, B, and G of matrix M.

Active region A shows a multicolor pattern image MP corresponding to an object decorated with four colors C1, C2, C3, and C4. Region A is a nearly square 240×239 pixel space situated between gray region G and black region B. Region A is indexed by (x,y) coordinates ranging from x=0,1, . . . ,239 and y=0,1, . . . ,238. A pixel of image MP is represented as $IP_{cxy}$ where the subscript "xy" corresponds to the (x,y) coordinates of the pixel and the subscript "c" collectively represents the three RGB color coordinates (or "color components") used to specify pixel color. Similarly, the separate RGB color coordinates may be individually represented by subscripts "r," "g," and "b." Thus, pixel $IP_{cxy}$ may alternatively be represented by: $IP_{rxy}$ for the red coordinate, $IP_{gxy}$ for the green coordinate, and $IP_{bxy}$ for the blue coordinate. The subscripts "x," "y," "c," "r," "g," and "b" are used with various variables and values hereinafter to similarly represent the color coordinates thereof.

A typical pixel IP of image MP is illustrated at (x,y) coordinates x=60, y=60, such that: $IP=IP_{c6060}$. Furthermore, unless otherwise indicated, it is assumed that each of the three RGB color coordinates has an 8 bit binary resolution corresponding to a base ten range of 0 to 255. This convention results in 24 bits of binary color information per pixel.

Region B refers to a black reference region used to correct an image in region A for low frequency noise due to drift of dark response by camera 30. Region B may be provided by a black felt rectangle. Region B is a 40×239 pixel rectangle indexed by (x,y) coordinates ranging from x=240,241, . . . ,279 and y=0,1, . . . ,238.

Region G refers to a gray reference region used to correct an image in region A for noise from the illumination source and drift in the gain of various channels of camera 30. Region G may be provided by a gray strip of paper. Region G is a 40×239 pixel rectangle indexed by (x,y) coordinates ranging from x=−1, −2, . . . , −40 and y=0, 1, . . . , 238.

The standards and conventions used herein are selected for convenience only and should not be construed as limiting. Indeed, these standards and conventions preferably vary with the capability and configuration of the selected hardware and any associated software. For example, the color coordinates, the image color and dimensional resolution, and the image format may vary. Also, various other signal standards may be employed, including, but not limited to the S-video standard (sync on one channel with chrominance on another) and the composite standard (luminance, chrominance, and sync all on one channel). In still other embodiments, a single chip camera, a line scan camera, a customized collection of optical sensors, or another type of imaging device may be used as would occur to one skilled in the art.

In one alternative embodiment, part sensing is not utilized. Instead, camera 30 is triggered on a periodic basis as a function of speed of conveyor 20 and spacing between items being carried on conveyor 20 for inspection. In still other embodiments, the provision of imaging signals may be selectively triggered by an operator, or triggering is not necessary to acquire an acceptable image of each item submitted for inspection.

Figure 4:
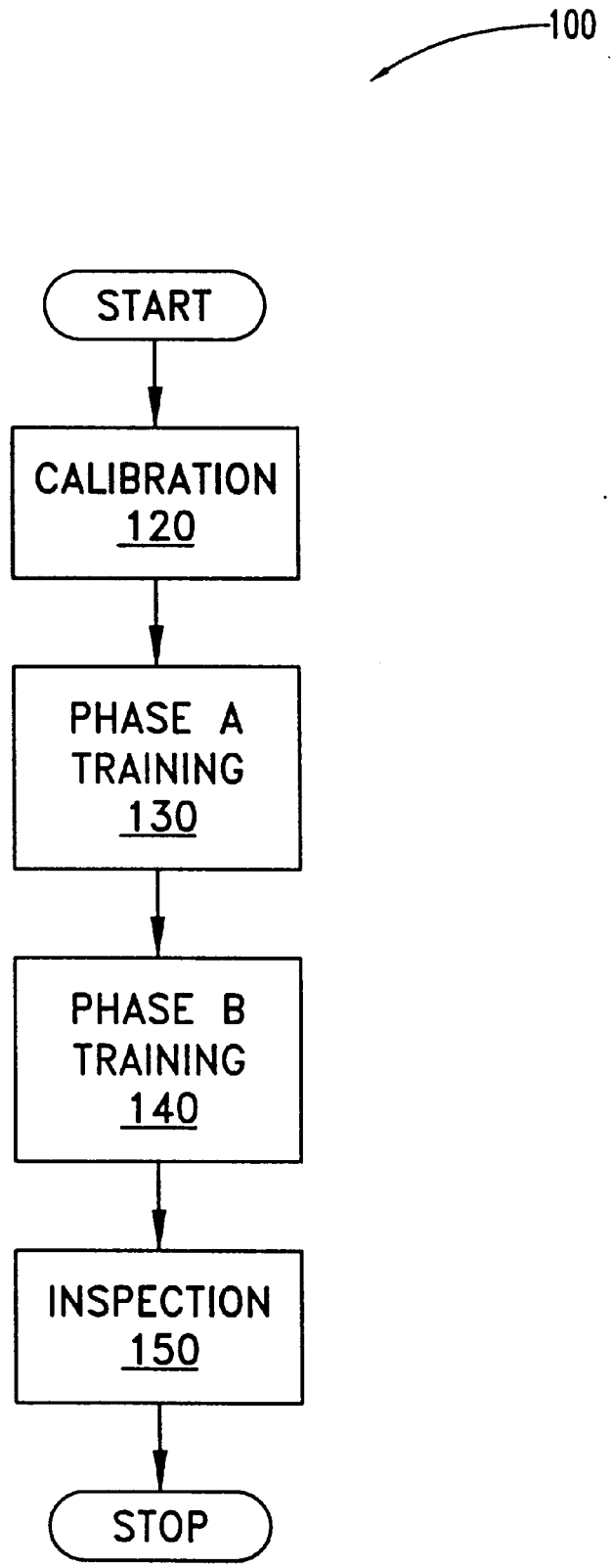
FIG. 4 is a flow chart of one process of the present invention using the embodiment of FIG. 2.

Referring also to FIG. 4, process 100 of one embodiment of the present invention utilizing system 10 is illustrated. Implementation process 100 includes calibration 120 for calibrating the equipment of system 10 periodically. Process 100 also includes phase A training 130 which builds coloration information tables from selected samples of a multicolor pattern to be inspected. Phase B training 140 employs the coloration information tables determined during phase A training 130 to create reference data by utilizing additional samples of the selected multicolor pattern. This reference data is then used to conduct inspection 150 on a number of items with the selected multicolor pattern as they move by camera 30 on conveyor 20. Each of operations 120, 130, 140, 150 is preferably under control of an operator via input system 70. Preferably, these processes may be started and stopped at the operator's discretion. Additional details concerning each operation follows.

Figure 5:
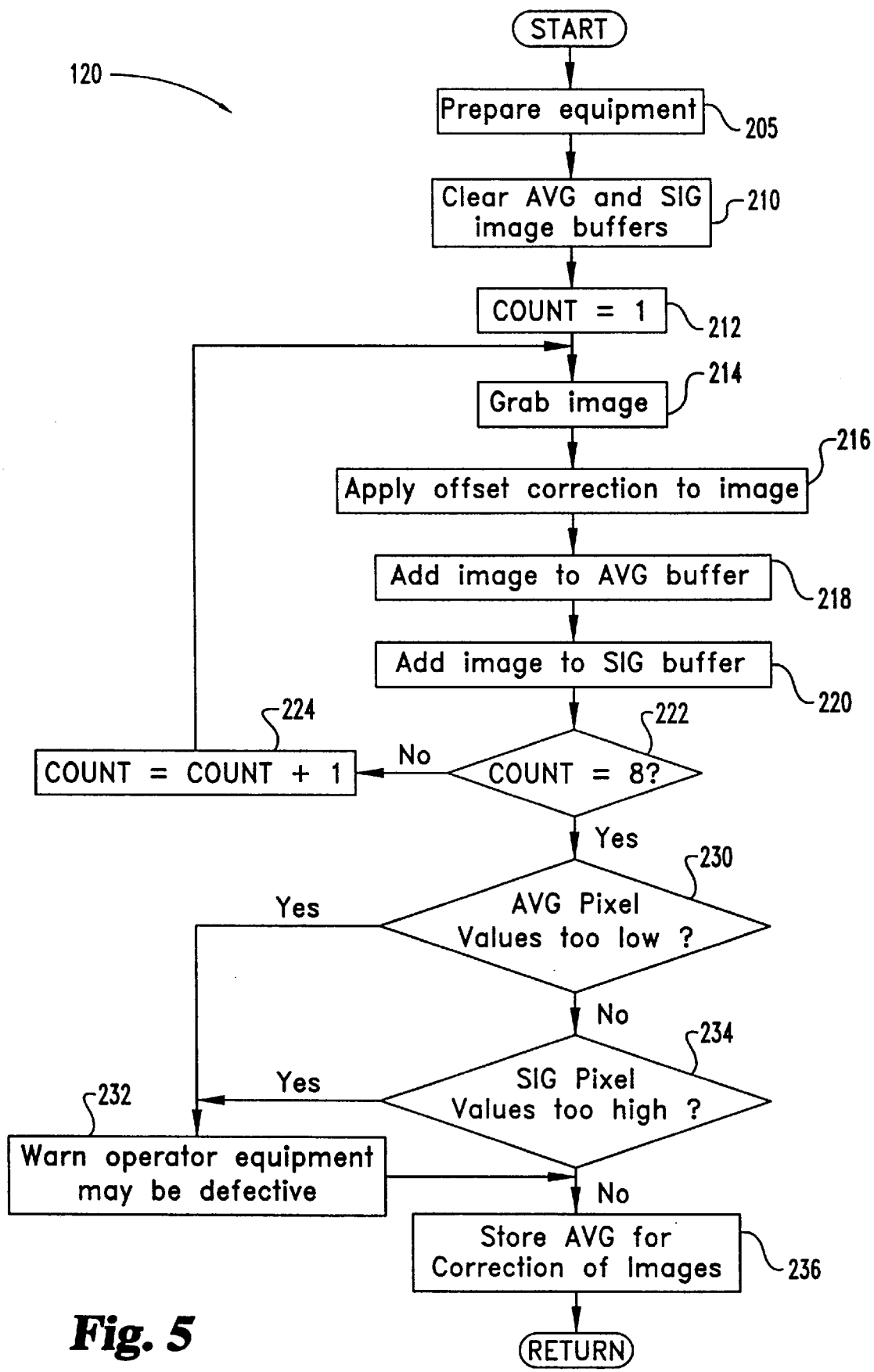
FIG. 5 is a flow chart illustrating calibration of FIG. 4 in greater detail.

FIG. 5 further illustrates selected details of calibration 120. Calibration 120 results in "uniformity correction" for various non-uniformities of system 10 equipment. Calibration 120 begins with preparation 205. Preparation 205 includes placement of a uniform white sheet (such as a thick sheet of high quality paper) over region A leaving region B uncovered. Gain of camera 30 and white balance (relative gains of channels corresponding to the color components RGB) are adjusted to a constant, WHITEAVG, corresponding to a bright unsaturated image. For 8 bit pixel color coordinate values, a value of WHITEAVG=200 for each of the coordinates is preferred ($IP_{cxy}=IP_{rxy}=IP_{gxy}=IP_{bxy}=200$).

After preparation 205, buffer images AVG and SIG (240× 239 pixel matrices) are cleared and allocated in stage 210.

Image buffer AVG holds the average color components of a number of images of the white sheet which is used to identify and compensate for non-uniform pixels over region A. Such non-uniformities are typically a kind of fixed pattern image noise. Image buffer SIG corresponds to the standard deviation of each pixel color value over the number of white images used to create image buffer AVG.

In stage 212 a counter variable, COUNT, corresponding to the number of white images is initially assigned COUNT=1. Next, an image acquisition and processing loop is entered. Each repetition of the loop corresponds to the acquisition and processing of another white image. In stage 214 of this loop, a white image is obtained using camera 30 and frame grabber 42. In stage 216, the grabbed image is submitted to offset correction as explained hereinafter.

Offset correction is provided for each color component from a group of pixels located in region B. In one embodiment, the central 128 pixels (y=56 to y=183) of column 278 (x=278) are selected and the color component of each of the 128 pixels is averaged and stored in a three component array designated $B_c$. Generally, these average pixels represent an amount of offset of each color component from the ideal zero value for a black image. Typically, the offset values for each color are about 5–10 for the selected 0–255 base ten range of each color component. The offset values may drift with temperature and time so that it is preferred to perform an offset correction on every image using a portion of representative pixels from region B.

To provide pixel by pixel offset corrections for representative pixel $IP_{cxy}$ of image MP of FIG. 3, an offset corrected pixel, designated $OP_{cxy}$ is determined as follows:

$$OP_{cxy} = \max(0, IP_{cxy} - B_c),$$

where the max( ) function provides the greatest value listed in the parentheses to prevent negative offset-corrected pixel values. This determination is repeated for each pixel of interest over the active region to provide an offset corrected image.

After offset correction, the white image is averaged into the AVG buffer in stage 218. Also, the standard deviation value is stored in the SIG buffer in stage 220. In conditional 222 a determination is made whether enough white images have been obtained. For the illustrated example, eight images have been selected, corresponding to COUNT=8 as a number sufficient to provide adequate uniformity correction; however, more or less white images may be used.

Once eight white images have been acquired and processed, control flows from conditional 222 to conditional 230. A region of pixels with color values from image buffer AVG that are significantly below the selected WHITEAVG constant corresponds to dark, noisy areas of the image and tends to indicate a defective portion of the CCD sensor array of camera 30. As a result, conditional 230 determines whether pixels from image buffer AVG fall below a selected threshold corresponding to possibly defective equipment. If this threshold is exceeded, control flows to warning 232 to warn the operator that the equipment may be defective.

If it is determined that pixel values for AVG are not too low, then control flows to conditional 234. In conditional 234 pixels from image buffer SIG are compared to a threshold to determine whether any pixels exceed a preselected value indicative of bad equipment. If SIG values are too high, control once more flows to warning 232 to inform the operator of the possible equipment problem. On the other hand, if SIG values are not too high then control flows to stage 236. In stage 236 image buffer AVG is stored for correction of images, then control returns to process 100.

Notably, the pixel level defect detection capability of the AVG and SIG buffers may be variously configured. For example, the blocks 230, 232, 234 may be configured to warn the operator only when a certain pixel quantity, density, or a function of both AVG and SIG values indicates failure. Furthermore, warning 232 may include information relating to the nature, location, number, density, and severity of suspected pixel flaws. Alternatively, an auto correction feature may be incorporated to replace bad pixels as a function of the value of neighboring pixels as part of calibration 120.

Uniformity correction using image buffer AVG after offset correction to produce a pixel is next discussed. An "average calibration pixel" of the image buffer AVG is represented by $AVG_{cxy}$. The following equation provides a pixel having offset and uniformity correction as represented by variable $UOI_{cxy}$:

$$UOI_{cxy} = (\text{WHITE}AVG/AVG_{cxy}) * OP_{cxy}$$

where $OP_{cxy}$ is a pixel with offset correction. Uniformity correction of an image is provided by applying this correction to each image pixel after offset correction. Typically, for most pixels, the value in parentheses is close to unity corresponding to only a minor correction.

Unlike the determination of $B_c$ for offset correction, the determination of image buffer AVG via calibration 120 is generally computationally inefficient. As a result, calibration 120 is preferably performed only occasionally to reestablish a new image buffer AVG. Typically, calibration 120 is performed when equipment changes are made or when a long period of use has passed since the previous calibration 120.

In contrast, new values $B_c$ are preferably recomputed for each image.

Similarly, another correction factor, gain correction $G_c$ is also preferably computed for each image. Gain correction $G_c$ corresponds to noise from the illumination source and drift in the gain of channels for camera 30 over time. Gain correction is preferably determined by using the central 128 pixels (y=56 to y=183) of column x=−39 of region G. Gain correction $G_c$ represents average color values for the selected pixels. As part of initially setting up system 10, reference gains, $RG_c$, are determined for a selected reference image and stored as the average color values for the central 128 pixels of column x=−39. Typically, the reference image will be the first image generated during phase A training 130.

A fully corrected pixel $p_{cxy}$ is determined by providing gain correction to a pixel $UOI_{cxy}$ as follows:

$$p_{cxy} = \min(255, \text{nint}((RG_c/G_c) * UOI_{cxy})),$$

where the function min( ) assures that color values do not exceed the maximum end of the color value range (255) and the function nint( ) selects the nearest integer value. This operation is performed for each pixel of interest to generate a fully corrected image.

Figure 6A:
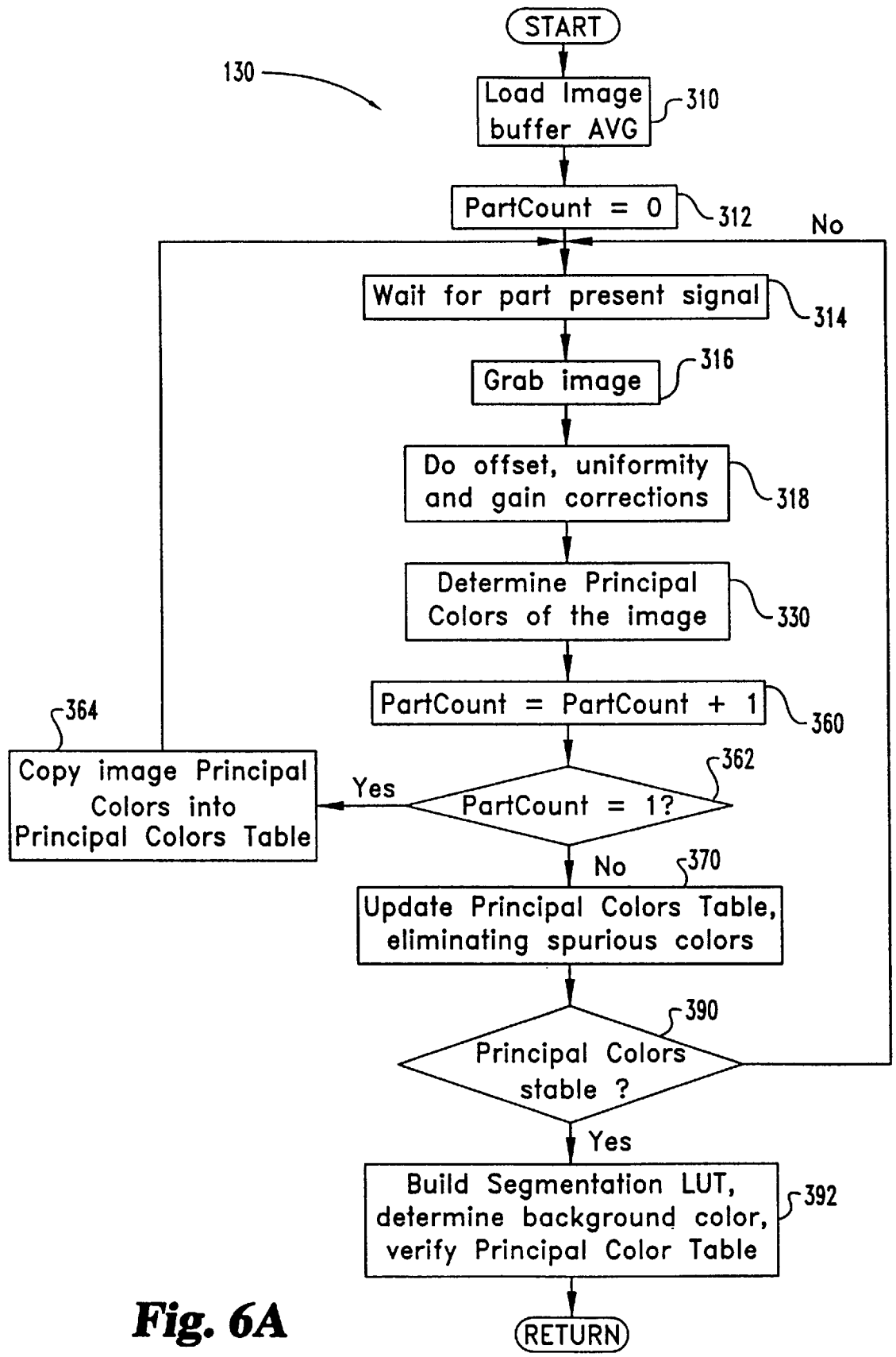
FIG. 6A is a flow chart depicting phase A training of the process of FIG. 4 in greater detail.

FIG. 6A is a flow chart depicting phase A training 130 in greater detail. Phase A training 130 begins with stage 310 by loading image buffer AVG for uniformity correction. Next, in stage 312, a counter, PartCount, is set to 0. PartCount corresponds to a count of sample parts used during phase A training 130. Each sample part is decorated with a multicolor pattern which is characterized during training for subsequent inspection of parts bearing the pattern.

After stage 312, a loop is entered beginning with stage 314. Each successive execution of this loop corresponds to a different sample image to be processed. In stage 314, processor 40 waits until sensor 50 generates a part present signal indicating alignment of a sample part on conveyor 20 with camera 30. Correspondingly, processor 40 triggers shuttering of camera 30 to generate a sample image of the aligned part.

In stage 316 the sample image is grabbed with frame grabber 42 and digitized resulting in an uncorrected pixel image. This uncorrected pixel image then undergoes offset, uniformity, and gain corrections in stage 318. These corrections are performed on the image in accordance with the procedures previously described in connection with calibration 120. Specifically, offset correction is performed as a function of $B_c$, uniformity correction is performed as a function of values from image buffer AVG, and gain correction is performed as a function of $RG_c$ and $G_c$. The correction factors $B_c$ and $G_c$ are preferably determined for each image grabbed. Uniformity correction of stage 318 is determined using image buffer AVG determined in accordance with calibration 120 and $RG_c$ is preferably already established.

In stage 330, a number of principal colors for the multicolor pattern of the sample image are determined. One object of phase A training 130 is to identify and characterize the most prominent colors of the parts to be submitted to inspection by system 10. These colors are designated "principal colors" and correspond to color clusters of highly occupied and generally highly dense pixel sites in a digitized color space. The principal colors are described by a numeric table generated from a set of principal color arrays. The principal color table is saved at the end of phase A training for subsequent use in phase B training 140 and inspection 150.

An 8 bit range for each pixel color coordinate corresponds to a digitized, cubic RGB color space lattice with about $16.9 \times 10^6$ sites. The 240×239 pixels of region A result in a pixel density in this digitized color space of about $3.42 \times 10^{-3}$ per site. This sparsely occupied site generally tends to make identification of principal colors difficult. As a result, a method to coarsen color space by reducing the number of bits per color coordinate is utilized in this embodiment of the present invention. The number of bits per color versus pixels per site is illustrated in the following table:

| $\eta$ (bits/color) | $\rho$ (pixels/site) |
|---|---|
| 0 | $5.74 \times 10^4$ |
| 1 | $7.17 \times 10^3$ |
| 2 | $8.96 \times 10^2$ |
| 3 | $1.12 \times 10^2$ |
| 4 | $1.40 \times 10^1$ |
| 5 | $1.75 \times 10^0$ |
| 6 | $2.19 \times 10^{-1}$ |
| 7 | $2.74 \times 10^{-2}$ |
| 8 | $3.42 \times 10^{-3}$ |

Where $\eta$ is the number of bits per color and $\rho$ is determined as: $\rho = (240 \times 239)/2^{(3 \cdot \eta)}$. An empirically determined preferred value of $\eta$ is 3; however, greater or smaller values may be selected for other embodiments.

Assuming a selected value of $\eta = 3$, the number of corresponding digitized lattice sites of the resulting coarsened color space will be 512. This coarsened color space representation may be indexed by the 3 bit coordinates i,j,k, which correspond to the three RGB coordinates of the coarsened color space lattice sites.

Figure 6B:
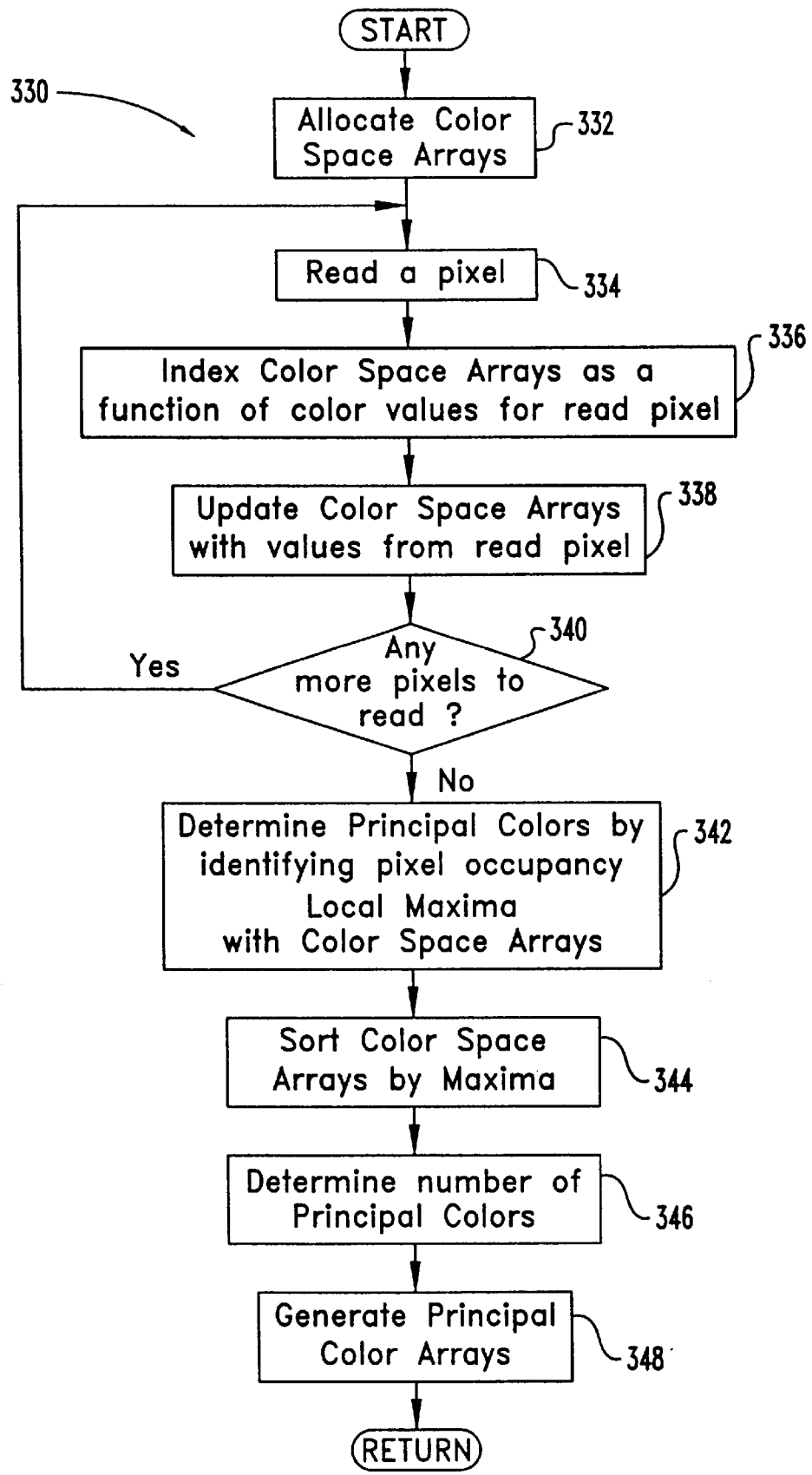
FIG. 6B is a flow chart depicting one stage of FIG. 6A in greater detail.

Referring also to FIG. 6B, stage 330 is shown in greater detail. Stage 332 includes allocation which is performed by allocating four color space arrays $N_{ijk}$, $R_{ijk}$, $G_{ijk}$, and $B_{ijk}$. Each of these arrays has 512 locations corresponding to all values of each of the i,j,k coordinates. Initially, each array location is set to zero. Next, a pixel reading loop is entered beginning with stage 334 and the 8 bit RGB color component values of a pixel $P_{cxy}$ from the sample image are read and stored in variables r,g,b in accordance with: $r = p_{rxy}$, $g = P_{gxy}$, and $b = p_{bxy}$.

In stage 336, the color component values r,g,b for the pixel read in stage 334 are used to determine the coarsened color space index values i,j,k in accordance with the following:

$$i = r\%2^{(8-\eta)},$$

$$j = g\%2^{(8-\eta)},$$

$$k = b\%2^{(8-\eta)},$$

where (%) represents integer division. This puts the upper $\eta$ bits of r,g,b into i,j,k, respectively.

In stage 338, each location of the color space arrays are updated with numeric data corresponding to the color values r,g,b and pixel occupancy in accordance with the following substitutions for all i,j,k:

$$N_{ijk} = N_{ijk} + 1,$$

$$R_{ijk} = R_{ijk} + r,$$

$$G_{ijk} = G_{ijk} + g,$$

$$B_{ijk} = B_{ijk} + b.$$

Generally, $N_{ijk}$ corresponds to the number of pixels from the 240×239 corrected sample image indexed to a given coarsened color space lattice site. As a result, array $N_{ijk}$ indicates sample image pixel occupancy in each of the 512 coarsened color space lattice sites. Each $R_{ijk}$ array location contains a summation of the 8 bit r color component value for each sample image pixel occupying the coarsened color space lattice site having the same i,j,k index as the $R_{ijk}$ array. Similarly, the $G_{ijk}$ and $B_{ijk}$ arrays respectively correspond to summations of the g and b color component values of each sample image pixel occupying the same coarsened color space lattice site.

Next, conditional 340 is encountered to determine whether any more pixels from the corrected sample image need to be processed. Specifically, for the 240×239 pixel matrix of region A, about 57,400 pixels may need to be processed. If any more pixels are required then control loops back to stage 334 to read the next pixel and repeat stages 336 and 338 accordingly.

If all the pixels have been read, as determined by conditional 340, then control flows to stage 342. In stage 342 the quantity of occupancy array $N_{ijk}$ of each i,j,k site is examined to look for local maxima. Although a local maxima may be variously defined, one preferred method of determination is when $N_{ijk}$ is greater than all 26 of its nearest neighbors. These local maxima correspond to the principal colors for a given image. Stage 342 also determines the number of local maxima as $N_p$. Furthermore, the color space arrays are reorganized to be indexed by coordinates in,jn,kn where n corresponds to a given local maximum and cannot exceed the number of local maxima, $N_p$. In stage 344, the color space arrays are sorted by decreasing occupancy of $N_{injnkn}$ as a function of the local maxima determined in stage 342, so that $N_{i1j1k1}$ (e.g. n=1) corresponds to the largest local maximum.

In stage 346 the number of principal colors to be used are determined as a function of NMAX, where NMAX is a maximum number of principal colors permitted. This substitution is expressed as follows: $N_p=\min(N_p, NMAX)$, where min( ) is a function to determine the minimum number listed within the parentheses.

In stage 348, the principal color arrays are generated from the color space arrays as follows:

$$PCN_n = N_{injnkn}/(240 \times 239)$$

$$PCR_n = R_{injnkn}/N_{injnkn}$$

$$PCG_n = G_{injnkn}/N_{injnkn}$$

$$PCB_n = B_{injnkn}/N_{injnkn}$$

for $n=1, 2, \ldots, N_p$. The color space location ($PCR_n$, $PCG_n$, $PCB_n$) is designated the nth principal color, and $PCN_n$ is the fraction of sample image pixels associated with the nth principal color. Once the principal color arrays have been generated for the given image, control returns to the next stage of training 130.

Returning to FIG. 6A, the next stage after the determination of principal colors in stage 330 is a loop counter 360 which increments PartCount. Next, conditional 362 is encountered where it is determined whether this is the first sample image processed, corresponding to PartCount=1. If it is the first image, the control flows to stage 364 where a principal colors table is initially generated from the principal colors arrays determined from the first sample image. Control then loops back to stage 314 to await the next part present signal and determine principal color arrays corresponding to the corrected sample image for the next sample part.

On the other hand, if this is not the first image processed, then control flows to stage 370 to update the existing principal colors table and reduce or eliminate any inconsistent or spurious colors. Generally, "spurious colors" are artifacts of the image digitation process due to pixels which straddle two regions of different color. For example, the boundary between a red region and a green region of a multicolor pattern can produce yellow pixels (red+green= yellow) even if the part image contains no yellow. If such a boundary is long, there can be enough yellow pixels to yield a spurious yellow principal color. Spurious principal colors can be unstable from image to image because of their relatively small occupancy and the fact that their color coordinates are sensitive to sub-pixel positioning of color boundaries. Indeed, spurious principal colors may appear in some images but not in others so that the number of principal colors may change from part to part. This instability may be used to identify and remove spurious principal colors through a pairing function as described in greater detail in connection with FIG. 6C.

Figure 6C:
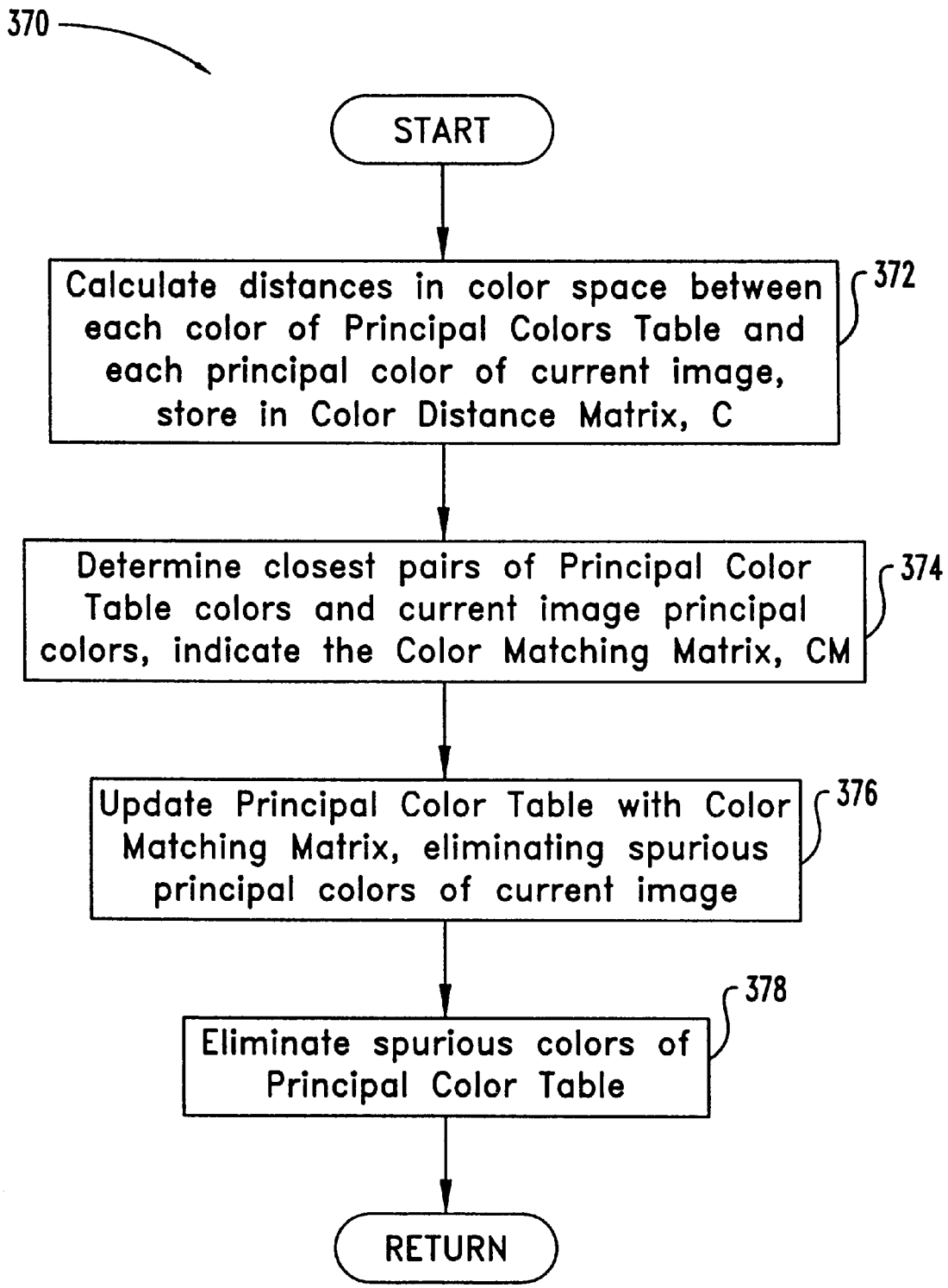
FIG. 6C is a flow chart depicting another stage of FIG. 6A in greater detail.

As shown in FIG. 6C, a color distance matrix C is created in stage 372. Each element of matrix C corresponds to the distance between each of the $N_p$ colors of the principal color table determined from previous samples and and the $N_{p'}$ principal colors determined from principal color arrays for current sample image. As such, color distance matrix C has $N_p$ rows and $N_{p'}$ columns. The equation to determine each element of color distance matrix C is: $C_{nn'}=((PCR_{n'}-PCR_n)^2+(PCG_{n'}-PCG_n)^2+(PCB_{n'}-PCB_n)^2)^{1/2}$, for all $n=1,2, \ldots, N_p$ principal colors from the principal colors table and all $n'=1,2, \ldots, N_{p'}$ of the principal colors from the principal color arrays $PCR_{n'}$, $PCG_{n'}$, and $PCB_{n'}$ for the current sample image (where primes "'" correspond to variables associated with the current image as opposed to previous images). An example of the color distance matrix C is illustrated in FIG. 6D for a principal colors table having $N_p=4$ corresponding to 4 rows and $N_{p'}=5$ corresponding to 5 columns. Each entry of the color distance matrix of FIG. 6D corresponds to the distance between the colors heading the intersecting row and column. For $C_{32}$ (row 3 and column 2), the color space distance separating these principal colors is 2, $C_{32}=2$. Similarly, $C_{11}=2$, corresponds to a color space distance of 2 separating the designated principal color 1 from the principal color table and principal color 1 from the principal color arrays for the current sample image.

Once the color space distance matrix C is created, a color matching matrix CM is created in stage 374. Similar to matrix C, matrix CM has $N_p$ rows and $N_{p'}$ columns. Each location $CM_{nn'}$ is assigned a value of zero (0) unless the corresponding element $C_{nn'}$ is the minimum element in both row n and column n' of color distance matrix C. Using this criteria, FIG. 6E illustrates an example of matrix CM corresponding matrix C illustrated in FIG. 6D. Specifically, $N_p=4$ and $N_{p'}=5$. Applying the color matching matrix CM criteria, $C_{21}=1$ is a minimum value for both row 2 and column 1 of the example color distance matrix, so that $CM_{21}1$. Similarly, $C_{12}$ and $C_{33}$ are minimums corresponding to $CM_{12}=CM_{33}=1$. Otherwise columns 4 and 5 of the color distance matrix shown in FIG. 6D do not meet the criteria to provide a color match and so these columns correspond to spurious principal colors of the principal color arrays of the current sample image. Likewise, row 4 of the color matching matrix shown in FIG. 6E contains no matches and corresponds to an inconsistent principal color in the principal color table. In effect, color distance matrix C and color matching matrix CM correspond to a determination of which pairs of colors are closest in color space, where each pair has one member from the principal color table and another member from the principal color arrays of the current image. Notably, in making this determination for each pair, the color from the principal color table is closer to the paired principal color of the current image than any other of the principal colors in the current image; and the principal color from the current image of each pair is closer to the principal color from the principal color table than any other principal color in the principal color table.

The principal color table is updated in stage 376 with only those colors from the current sample image found to match to one of the colors in the principal color table. For the example shown in FIG. 6D and 6E, principal colors from the principal color arrays corresponding to columns 4 and 5 are eliminated.

In stage 378, spurious colors of the principal color table which do not produce a match in the color matching matrix are eliminated. For the example of FIGS. 6D and 6E, a spurious color of the principal color table is represented in row 4 and would therefore be eliminated. Once spurious colors are eliminated, control is returned to complete the remainder of phase A training as detailed in FIG. 6A.

Returning to FIG. 6A, after stage 370, conditional 390 is encountered to determine whether principal colors in the principal color table have become stable. One preferred criteria for this determination is to track whether the number of principal colors $N_p$ has changed with the last 10 sample images. If the principal colors of the principal color table are not stable, then control returns to stage 314 to await a part present signal and grab another image for subsequent correction and principal colors determination. If the principal colors of the principal color table are stable, then control flows to stage 392.

In stage 392, the background color—the color surrounding the image parts of phase A training 130—is determined. It is preferred that the background color be indicated by organizing the principal colors table with decreasing occupancy and having the background color inserted in the first position. Notably, the background color is generally a rather high occupancy principal color. Thus, one way to determine the background color is by occupancy. Another way to determine the background color is to determine which color appears on the periphery of each image. Still another approach is to have the operator select the background color from among the various principal colors in the table, and then rearrange the table accordingly. In one embodiment, an operator may edit the principal colors table to change values or add or delete rows in a verification stage. Indeed, the principal colors may alternatively be determined by a manual process instead of phase A training 130.

Once the principal colors table is complete, it is saved to disk for later use in phase B training 140 and inspection 150. Furthermore, a segmentation look-up table (LUT) is established. Generally, the segmentation LUT maps each combination of the 8 bit color component values possible for image pixels to the nearest principal color n in the range n=1,2, . . . ,$N_p$. Thus, one example of a segmentation LUT has a 24 bit look-up address corresponding to the permutations of the three 8 bit RGB color coordinate values. However, a segmentation LUT with a 24 bit input address may be cumbersome to process. Thus, in one preferred embodiment, an approximation is utilized by employing only the upper 6 bits of each of the RGB color components to index the segmentation LUT. This approach results in only about 262,144 elements for the segmentation LUT. With this 6 bit approximation, the bottom two bits are preferably replaced with binary 10. In other embodiments, the segmentation LUT may use a different approximation, forego approximations, or otherwise devise a segmentation LUT suitable to the selected coloration format of the image as would occur to one skilled in the art.

The segmentation LUT may be used to correlate each pixel of an image to one of the principal colors. The color components for the correlated principal color may then be used to replace the color components of the image pixel to produce a segmented image. This segmented image may be displayed to an operator to confirm principal color processing. Alternatively or in addition RGB to HSI conversion may be performed and the HSI coordinates mapped to a standard color vocabulary (e.g., light saturated red, dark yellow-green, etc . . . ). In either case, it is preferred the operator review the results of phase A training and determine whether parameters should be adjusted and the training repeated before proceeding to phase B training. Among the factors which should be considered by the operator in making this evaluation are illumination, field of view, quality of sample parts used for phase A training 130, and value of η.

Figure 7A:
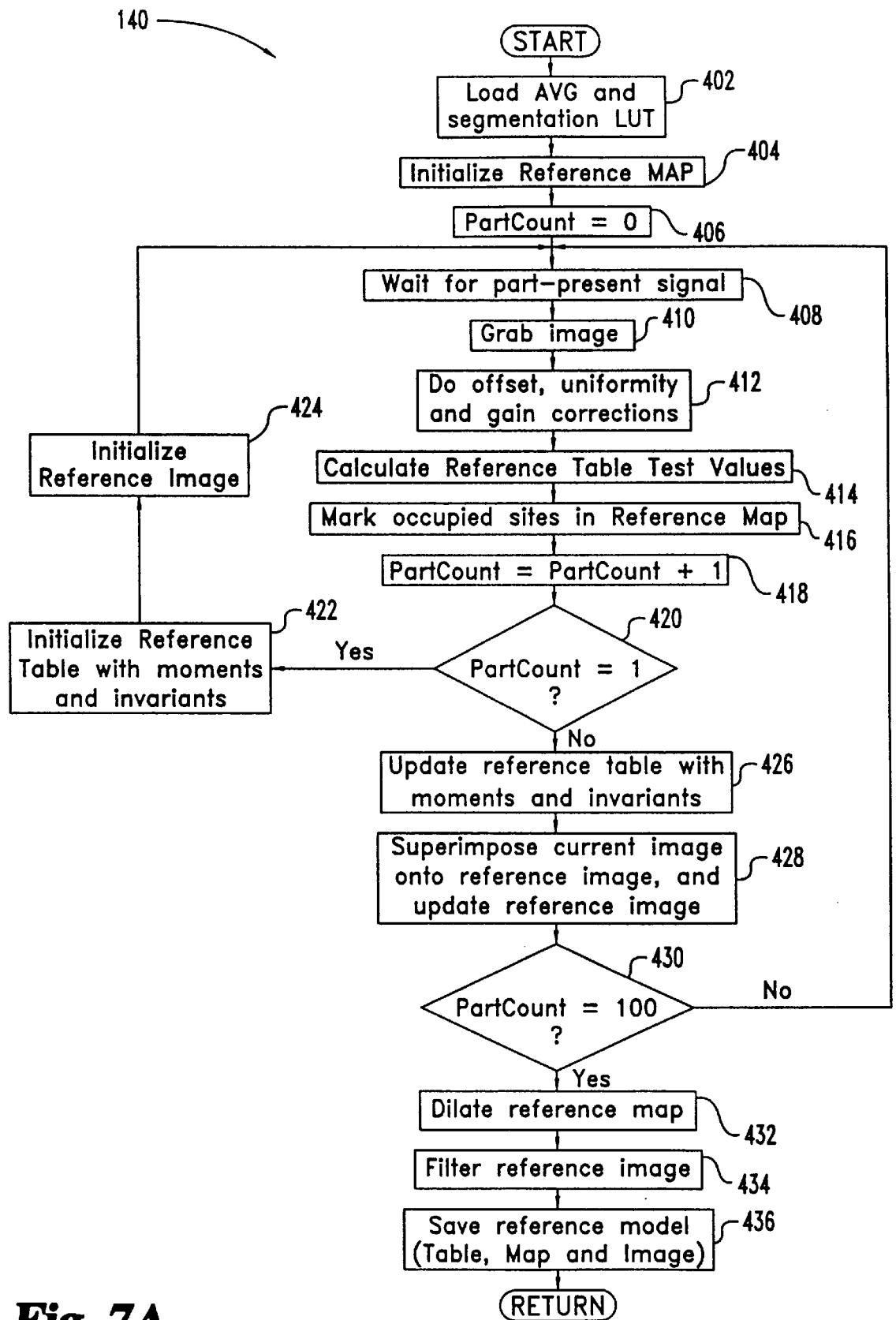
FIG. 7A depicts a flow chart showing phase B training of the process of FIG. 4 in greater detail.

Referring to FIG. 7A, phase B training 140 is next discussed. Phase B training 140 builds on information developed during phase A training 130. Among the objects of phase B training 140 is to develop a reference model. This reference model includes a reference table with sets of test values, a reference map, and a reference image. Phase B training 140 is determined by evaluating images of a number of samples having a multicolor pattern. The number of samples used to develop the phase B training reference model can vary; however, it is preferable to use about 100 parts.

In stage 402 of phase B training 140, image buffer AVG from calibration 120 and the segmentation LUT developed from phase A training 130 are loaded. In stage 404, a reference map is initialized which is used to track all colors observed during phase B training 140. Initialization 406 sets loop counter PartCount to 0. PartCount corresponds to each image processed during phase B training 140.

Next, an image processing loop is entered beginning with stage 408. In stage 408, a part present signal from sensor 50 is awaited. Once a part present signal is detected, the image is grabbed by frame grabber 42 in stage 410 and then corrections 412 are performed including offset, uniformity, and gain corrections previously discussed in connection with calibration 120 and phase A training 130.

In stage 414, various reference table test values are calculated for the sample image after corrections 412. Generally, the test values are derived from a segmented image of the sample image having various regions of uniform principal color. This segmented image representation of the sample image is generated by addressing the segmentation LUT with each sample image pixel color value to obtain the closest principal color value. The reference table test values characterize the color scheme of the multicolor pattern and its geometry in a way that is independent a part location and orientation with respect to the field of view of camera 30. Preferably, these numbers are a function of uniformly colored regions of the segmented image representation of the sample image with a set of test values corresponding to each such region. Frequently, each test value set is a function of size of the region. Region size may be variously represented, including surface area or the number of pixels belonging to the region.

One type of test value preferred for the reference table are moments representative of the principal color regions of the sample image. These moments are calculated in color space and physical space with respect to the principal color regions. The zero order moment (0th) moment (in both color and physical space) of a principal color region n corresponds to the number of pixels assigned to the region and may be written:

$$N_n = \sum_{xy \in n} 1,$$

where the notation xy ∈ n indicates the summation is over all pixels assigned to a principal color region n of the image. The color space first moments of region n correspond to average RGB components of that region given by:

$$R_n = \frac{1}{N_n} \sum_{xy \in n} r_{xy}$$

$$G_n = \frac{1}{N_n} \sum_{xy \in n} g_{xy}$$

$$B_n = \frac{1}{N_n} \sum_{xy \in n} b_{xy}.$$

The physical space moments of region n of an image are the x and y locations of the region's centroid, given by:

$$X_n = \frac{1}{N_n} \sum_{xy \in n} x$$

$$Y_n = \frac{1}{N_n} \sum_{xy \in n} y.$$

Higher order moments are also defined. The physical-space central second moments of region n are defined by:

$$M_{XXn} = \left(\frac{1}{N_n}\sum_{xy \in n} xx\right) - X_n X_n$$

$$M_{XYn} = \left(\frac{1}{N_n}\sum_{xy \in n} xy\right) - X_n Y_n$$

$$M_{YYn} = \left(\frac{1}{N_n}\sum_{xy \in n} yy\right) - Y_n Y_n,$$

It is preferred that the test values be invariant with respect to part position and orientation. Such invariant quantities permit inspection of a part having a multicolor pattern randomly oriented with respect to the field of view of the camera 30. One preferred invariant quantity is the fraction of the image area covered by a principal color region n which relates the size of region n to the total image size. An expression describing this fractional image area in terms of the nth principal color region is as follows:

$$A_n = N_n/(240 \times 239).$$

The quantities $A_n$ are invariant and are preferably included in the reference table. Furthermore, it should be noted that $A_n$ is proportional to the zeroth moment $N_n$, and that:

$$\sum_{n=1}^{N_p} A_n = 1.$$

All color space moments are invariant because spatial translations and rotations generally do not affect color space. As such, the first color space moments are preferably included in the reference table.

Generally, physical space moments are not invariant, but certain preferred invariant quantities are determined as a function of physical space moments. For example, a principal color region n may generally correspond to a two-dimensional object with unit mass and uniform density (mass per unit area), so a corresponding inertia tensor may be created as follows:

$$I_n = \begin{pmatrix} M_{XXn} & M_{XYn} \\ M_{XYn} & M_{YYn} \end{pmatrix},$$

Furthemore, the eigenvalues of I are the principal moments of inertia corresponding to the following expression:

$$I_N^{\pm} = \frac{M_{XXn} + M_{YYn}}{2} \pm \left(\left(\frac{M_{XXn} - M_{YYn}}{2}\right)^2 + M_{XYn}\right)^{1/2}.$$

With the exception of the background region, the principal moments of inertia are also invariant. Additional invariants include the principal radii of gyration as defined by:

$$U_n = \sqrt{I_n^+}$$

$$N_n = \sqrt{I_n^-},$$

Similarly, except for the background region, each principal radius of gyration is also invariant and is preferably included in the reference table. Notably, the principal radii of gyration characterize the shape of each corresponding principal color region of the image.

Additional invariants preferably included in the reference table are the inter-centroid distances for each possible pair of non-background regions. These distances may be included in a matrix $D_{nn'}$, where n corresponds to one region and n' corresponds to the other region for each possible region pair. The calculation of matrix $D_{nn'}$ is as follows:

$$D_{nn'} = ((X_n - X_{n'})^2 + (Y_n - Y_{n'})^2)^{1/2}$$

The inter-centroid distance is invariant for all pairs except those involving background regions. The inter-centroid distances generally characterize the inter-region geometry of the parts.

A symbolic representation of a preferred reference table corresponding to a fully corrected and segmented sample image is shown as follows with the quantities $A_n$, $R_n$, $G_n$, $B_n$, $U_n$, $V_n$ and $D_{nn'}$ calculated for each region n and n' over the range of $1,2,\ldots,N_p$ where $N_p$ is the total number of principal colors in the principal color table.

| n | A | R | G | B | U | V |
|---|---|---|---|---|---|---|
| 1 | $\mu_i(A_1)$ | $\mu_i(R_1)$ | $\mu_i(G_1)$ | $\mu_i(B_1)$ | $\mu_i(U_1)$ | $\mu_i(V_1)$ |
|   | $\sigma_i(A_1)$ | $\sigma_i(R_1)$ | $\sigma_i(G_1)$ | $\sigma_i(B_1)$ | $\sigma_i(U_1)$ | $\sigma_i(V_1)$ |
| 2 | $\mu_i(A_2)$ | $\mu_i(R_2)$ | $\mu_i(G_2)$ | $\mu_i(B_2)$ | $\mu_i(U_2)$ | $\mu_i(V_2)$ |
|   | $\sigma_i(A_2)$ | $\sigma_i(R_2)$ | $\sigma_i(G_2)$ | $\sigma_i(B_2)$ | $\sigma_i(U_2)$ | $\sigma_i(V_2)$ |
| . | . | . | . | . | . | . |
| $N_p$ | $\mu_i(A_{N_p})$ | $\mu_i(R_{N_p})$ | $\mu_i(G_{N_p})$ | $\mu_i(B_{N_p})$ | $\mu_i(U_{N_p})$ | $\mu_i(V_{N_p})$ |
|   | $\sigma_i(A_{N_p})$ | $\sigma_i(R_{N_p})$ | $\sigma_i(G_{N_p})$ | $\sigma_i(B_{N_p})$ | $\sigma_i(U_{N_p})$ | $\sigma_i(V_{N_p})$ |

| n | 1 | 2 | ... | $N_p$ |
|---|---|---|-----|-------|
| 1 | $\mu_i(D_{11})$ | $\mu_i(D_{12})$ | ... | $\mu_i(D_{1N_p})$ |
|   | $\sigma_i(D_{11})$ | $\sigma_i(D_{12})$ | ... | $\sigma_i(D_{1N_p})$ |
| 2 | $\mu_i(D_{21})$ | $\mu_i(D_{22})$ | ... | $\mu_i(D_{2N_p})$ |
|   | $\sigma_i(D_{21})$ | $\sigma_i(D_{22})$ | ... | $\sigma_i(D_{2N_p})$ |
| . | . | . |  | . |
| $N_p$ | $\mu_i(D_{N_p1})$ | $\mu_i(D_{N_p2})$ | ... | $\mu_i(D_{N_pN_p})$ |
|   | $\sigma_i(D_{N_p1})$ | $\sigma_i(D_{N_p2})$ | ... | $\sigma_i(D_{N_pN_p})$ |

After these values are calculated, then averages and standard deviations of the reference table values are updated. The terms $\mu_i(Q)$ and $\sigma_i(Q)$ represent the average and standard deviation of some quantity Q over the first i sample images, respectively. The averages and standard deviations are updated recursively as follows:

$$\mu_i(Q) = \left(\frac{i-1}{i}\right)\mu_{i-1}(Q) + \left(\frac{1}{i}\right)Q_i$$

$$\sigma_i^2(Q) = \left(\frac{i-2}{i-1}\right)\sigma_{i-1}^2(Q) + \left(\frac{1}{i-1}\right)Q_i^2 + \mu_{i-1}^2(Q) - \left(\frac{i}{i-1}\right)\mu_i^2(Q),$$

where $Q_i$ is the ith sample of Q and $\mu_1(Q)=Q_1$, and $\sigma_1(Q)=0$. In other embodiments the recursive updating scheme may not be used; however, it generally facilitates on the fly updating to improve overall computational efficiency.

The reference table is saved for subsequent use in inspection 150. Notably, compared to the space occupied by the pixels of region A, reference table values may be determined and used to detect color defects in the multicolor pattern while occupying only a small fraction of the memory space occupied in systems which compare the inspection image to a reference image pixel by pixel. In one preferred embodiment, the reference table test values occupy no more than 10% of the memory space occupied by the sample image pixels. In a more preferred embodiment, the test values occupy no more than 5% of the memory space occupied by the sample image pixels. In a most preferred embodiment, the test values corresponding to the reference table occupy no more than 2% of the memory space occupied by the pixels of the sample image pixels. One advantage of the small amount of memory space occupied by the test values for the reference table is that comparison of test values for a sample to reference table test values may be performed without resorting to a less efficient pixel by pixel comparison of some systems.

One advantage of the reference table approach is in identifying multicolor pattern flaws or color shifts. As used herein, a "pattern flaw" means an improper physical space arrangement of the colors of the multicolor pattern. One example of a pattern flaw is the inadvertent placement of a color of a multicolor pattern on a portion of the pattern not intended to have that color. As used herein, a "color shift" means the shift of a colored portion of an item from one color to another color. One example of a color shift is when a light blue region of a multicolor pattern shifts to dark blue. In alternative embodiments, other test value functions of the principal color regions, either invariant or dependent on physical orientation of the object being inspected, may be used as would occur to one skilled in the art.

After determination of reference table values in stage 414, stage 416 is encountered which marks a reference map with colors that are observed in the current sample image. Preferably, this reference map is coarsened using the same i,j,k coordinate indexing used during phase A training 130 to determine principal colors as discussed in connection with the process described in FIG. 6B. This coarsened reference map has 512 locations initially set to zero. But as a pixel is read from an image acquired during phase B training 140, its corresponding i,j,k index is determined from the color component values r,g,b of the current sample image pixel and the corresponding site of the reference map is marked with a 1 indicating it is occupied. This process is repeated for each pixel of the image.

After stage 416, stage 418 increments PartCount in preparation for the next sample image. Conditional 420 is next encountered which determines whether the current image is the first image during phase B training 140 by testing for PartCount=1. If it is, then control flows to stage 422 to initialize the reference table with the determined test values and to stage 424 to initialize a reference image for later use. Control then returns to stage 408 to wait for the next part present signal and grab the next corresponding image for correction, determination of reference table test values, and to mark corresponding sites of the reference map.

On the other hand, if Part Count>1, then control flows to stage 426 to update $\mu_t(Q)$ and $\sigma_t(Q)$ of the reference table with the current test values from stage 414 and then onto stage 428.

In stage 428, a reference image initialized in stage 424 is updated. Preferably, the reference image includes an average image and an error image. Both images are formed by superimposing all training images and arithmetically combining them: the average corresponds to a pixel by pixel average of the images obtained during phase B training, and the error image is the pixel by pixel maximum deviation from the average.

To obtain a properly superimposed image on the reference image, the global centroid of an image is determined which corresponds to a centroid of all portions of the image except the background region. Also, an angular histogram of an image is determined which represents a radially-integrated non-background monochromic intensity of the image as a function of angle about the global centroid. Using the first image from phase B training 140 as a geometric reference or model image, all later images are effectively superimposed onto it. To superimpose a given image onto the model image, the given image is translated so that both global centroids coincide; then the given image is rotated about its global centroid until the correlation between the angular histograms of the model image and the current image is at a maximum. The average and error images are then updated recursively from the superimposed images The transformation which superimposes the ith sample image onto the model image is:

$$x' = \text{nint}((x-X^{(1)})\cos\theta^{(i)} - (y-Y^{(1)})\sin\theta^{(i)} + X^{(i)})$$

$$y' = \text{nint}((x-X^{(1)})\sin\theta^{(i)} + (y-Y^{(1)})\cos\theta^{(i)} + Y^{(i)})$$

where nint ( ) is a function providing the nearest-integer within the parenthesis, and pixel coordinates x',y' are invalid if they do not lie within region A. Such invalid pixel positions are then replaced by the average pixel for the previous image corresponding to the same location. The point $(X^{(i)}, Y^{(i)})$ is the global centroid—the centroid excluding the background region—of the ith image as given by:

$$X^{(i)} = \sum_{xy \notin 1} x \Big/ \sum_{xy \notin 1} 1$$

$$Y^{(i)} = \sum_{xy \notin 1} y \Big/ \sum_{xy \notin 1} 1,$$

In this case, $xy \notin 1$ indicates that the summation is over all pixels not included in the background region. The quantity $\theta^{(i)}$ is the counter-clockwise angle through which the ith image must be rotated in order to superimpose it on the model image.

The value of $\theta^{(i)}$ is obtained by correlating the angular histograms of monochrome renditions of the first and ith sample images. The angular histograms are calculated as follows:

$$h_j^{(i)} = \sum_{k=0}^{339} m_{x_{jk} y_{jk}}^{(i)},$$

where j=0,1, . . . ,511 is the angular index, and k is the radial index. The maximum value of k is 339 which corresponds to the length of the diagonal of the nearly square 240×239 pixel image space of region A, and:

$$m_{xy}^{(i)} = \begin{cases} \frac{1}{3}(r_{xy}^{(i)} + g_{xy}^{(i)} + b_{xy}^{(i)}) & \text{if } xy \notin 1 \\ 0 & \text{if } xy \in 1 \end{cases}$$

is the monochrome rendition of the ith training image with all background pixels set to zero, where $r_{xy}$, $g_{xy}$, and $b_{xy}$ correspond to the RGB color components of a sample image pixel, and:

$$x_{jk} = \text{nint}(X^{(i)} + k\cos(2\pi j/512))$$

$$y_{jk} = \text{nint}(Y^{(i)} + k\sin(2\pi j/512))$$

are the pixel coordinates corresponding to j and k, and it is understood that only terms with valid pixel coordinates ($0 \leq X_{jk} \leq 339$ and $0 \leq y_{jk} \leq 238$) are included in the summation over k. The pixel coordinates $x_{jk}$ and $y_{jk}$ correspond to the closest pixel of the sample image to the given jk coordinates for integer values of j=0,1, . . . , 511 and k=0,1, . . . ,339.

The correlation between the angular histograms of the ith image and the model image is given by:

$$X_j = \sum_{j'=0}^{511} h_{j+j'}^{(i)} \cdot h_{j'}^{(1)},$$

where the j+j' is treated as cyclic, so that it is computed modulo 512. Then:

$$\theta^{(i)} = 2\pi j_{max}/512,$$

where $j_{max}$ is the value of j for which $x_j$ is maximum.

It is preferred that many of the recursive aspects of these calculations be stored in look-up tables to enhance computational efficiency. Furthermore, it should be noted that the error image reveals how consistent the superimposed training images were from part to part. Typically, the largest pixel values in the error image correspond to a pattern edge, which are sensitive to slight misregistration errors during image superimposition. Also, the error image serves to locally adjust the sensitivity of the inspection process.

Figure 7B:
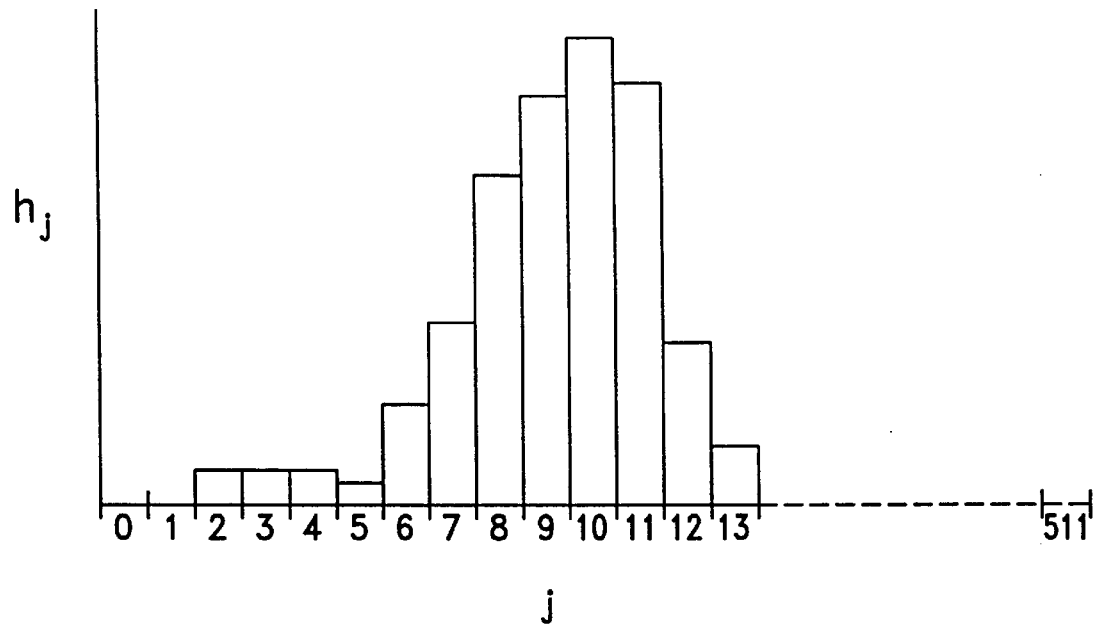
FIG. 7B is an example of an angular histogram of the type which may be used in performing the process of FIG. 4.
Figure 7C:
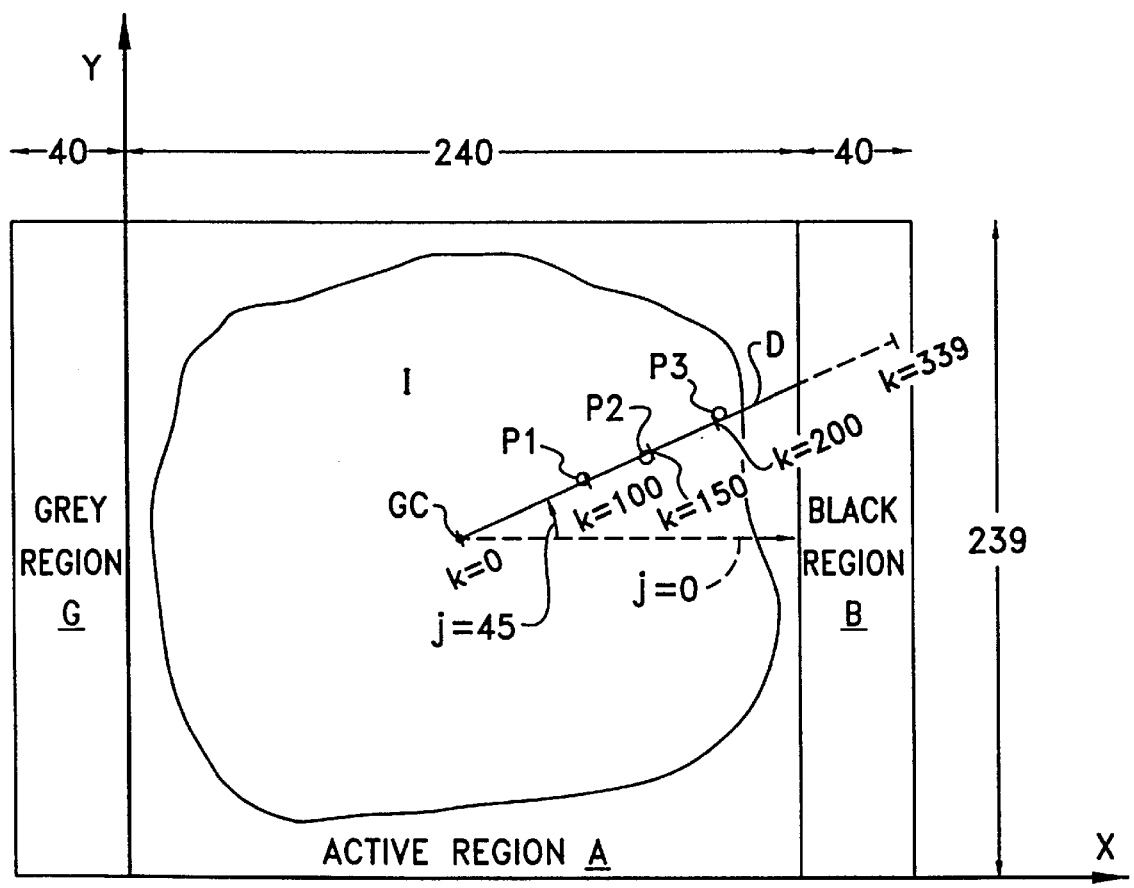
FIG. 7C diagrammatically illustrates a stage in the determination of an angular histogram of the type used in performing the process of FIG. 4.

Referring additionally to FIGS. 7B and 7C, certain aspects of the angular histogram and superimposition process are illustrated by way of non-limiting example. First, in FIG. 7B, an example graphically depicting a portion of an angular histogram is provided. Specifically, columns corresponding to angular coordinate j values 2–13 indicate summations over k of the $m_{xy}$ values corresponding to the monochrome renditions of pixels closest to each integer value of j and k. Notably, the histogram is only partial, including dashed lines to represent the portion of the histogram from j=14 through j=511.

In FIG. 7C, an image I is shown with a representative radial diagonal D through global centroid GC corresponding to the k coordinate. Diagonal D is depicted with increments of k from k=0 to k=339. Furthermore, a radial value of coordinate j is indicated as j=45. Also, the j=0 position is shown in dashed lines. In addition, the end portion of radial diagonal D is shown in phantom to correspond to a region which would be excluded as invalid because it is outside region A.

Image I also includes a number of representative pixels P1, P2, P3 determined to be closest to a jk coordinate pair for j=45. Each pixel is represented as a small cirle near a tick mark indicating a value of k. For example, for P1, j=45, k=100 corresponding to $P1_{jk}=P1_{45,100}$. Similarly, $P2_{jk}=P2_{45,150}$ and for $P3_{jk}=P3_{45,200}$. The color values of these nearest pixels will be summed in accordance with the determination of the monochrome value $m_{xy}$ to generate $h_j=h_{45}$. Similarly the remaining $h_j$ are determined to form an angular histogram for comparison to the angular histogram of the model image.

Generally, the angular histogram transformation procedure may be use to rotationally correlate a given image to the model image to enhance evaluation. For example, this correlation may be used to provide side by side comparison of the given image and model image each having the same rotational orientation. Furthermore, by translationally correlating the given image to the reference image so that the global centroid of the given image and the reference image coincide, a superimposed combination of the given image and model image may be generated.

Control flows from stage 428 to conditional 430 to determine if the sample PartCount for phase B training 140 has been exceeded. If it has not been exceeded, then control flows to the top of the loop once more waiting for a part present signal at stage 408. However, if a sufficient number of samples have been collected, 100 in the illustrated case, then control flows to stage 432.

In stage 432, the reference map corresponding to a coarsened color space marked with all colors found in the previous 100 training images is dilated by marking all 26 nearest neighbors of each originally marked site in the coarsened lattice. This further coarsens the reference map or dilates it so that small color shifts will not be identified as color flaws in inspection 150 using the reference map. Next, control flows to stage 434 to filter the reference image obtained by recursive performance of stage 428. One preferred filter effectively replaces every color component of every pixel by the maximum value of that color component in a nine pixel neighborhood centered upon that pixel. Such filtering typically reduces the number of false failures. In an alternative embodiment, a different filtering process known to those skilled in the art may be used. After stage 434, control flows to the stage 436 to save the reference model including the reference table of test values, the reference map, and reference image including both the average and error images.

Figure 8:
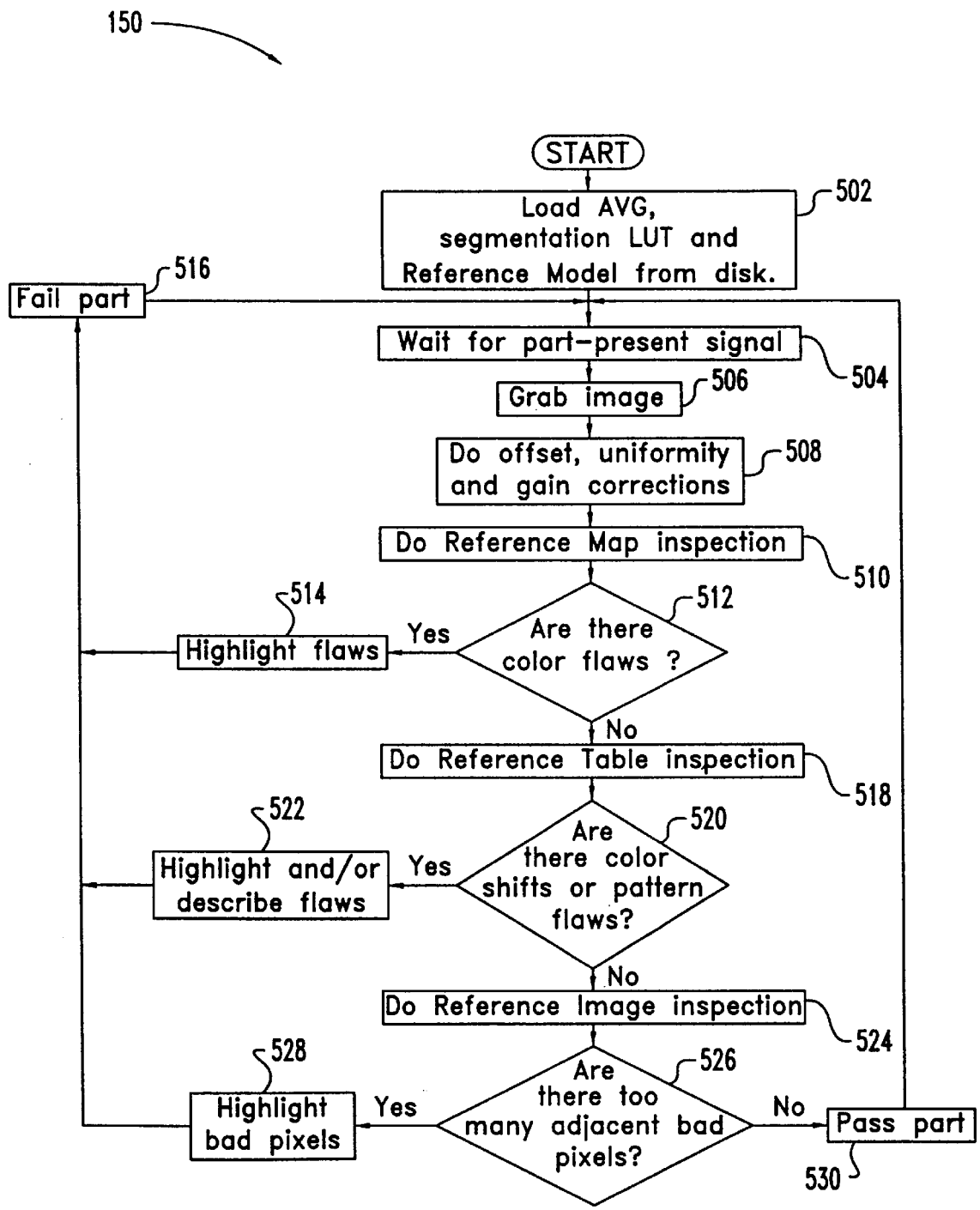
FIG. 8 is a flow chart depicting inspection of the process of FIG. 4 in greater detail.

FIG. 8 depicts a flow chart describing in more detail inspection 150. Inspection 150 begins with stage 502 by loading the uniformity correction image buffer AVG, the segmentation LUT determined during phase A training 130, and the reference model determined during phase B training 140. Control then flows to stage 504 at the top of an inspection loop. In stage 504, a part present signal is awaited. Once the part present signal is detected, an inspection image of a part submitted for inspection on conveyor 20 is grabbed by frame grabber 42 in stage 506, and offset, uniformity, and gain corrections are performed on that image in stage 508. The inspection image includes the multicolor pattern characterized by phase A training 130 and phase B training 140.

In stage 510, a reference map inspection is performed. In reference map inspection, a pixel counter is maintained to determine which pixels of the image of the part undergoing inspection fail to correspond to a pixel marked in the reference map developed during phase B training 140. Correspondingly, each pixel is used to address the reference map and locations not marked with one are flagged as bad pixel colors with the counter. If the number of bad pixels is greater than a threshold value, then the part is flagged as defective in accordance with conditional 512. Notably, a failure of reference map inspection corresponds to colors which are distinct from any color expected in any region of the inspection image. If such a "color flaw" is detected, it is highlighted in stage 514 and the part is subsequently failed in stage 516. Control then flows back to the top of the inspection loop to stage 504 to await the next part present signal.

If no color flaws are detected as determined in conditional 512, then control passes to stage 518 to perform reference table inspection. During reference table inspection, each pixel from the inspection image is used to address the segmentation LUT for correlation to one of the principal colors and to identify regions of the inspection image correlating to a uniform principal color. Next, invariant quantities corresponding to the test values of the reference table are calculated for the inspection image. Preferably, these invariant quantities include $A_n$, $R_n$, $G_n$, $B_n$, $U_n$, $V_n$, and $D_{nn'}$ using the same expressions as were used to initially determine the reference table values during stage 414 of phase B training 140. Employing the average and standard deviation values generated during phase B training 140, positive standard errors corresponding to the current inspection image test values are generated in accordance with the following equations:

$$\epsilon(A_n) = |A_n - \mu(A_n)| / \sigma(A_n)$$
$$\epsilon(R_n) = |R_n - \mu(R_n)| / \sigma(R_n)$$
$$\vdots$$
$$\epsilon(D_{nn'}) = |D_{nn'} - \mu(D_{nn'})| / \sigma(D_{nn'}),$$

where $\mu(\ )$ and $\sigma(\ )$ represent the reference table average and standard deviation. In the above expressions $\epsilon(\ )$ corresponds to the positive standard error for the type of test value included in the paretheses. The positive standard errors $\epsilon(A_n)$, $\epsilon(U_n)$, $\epsilon(V_n)$, and $\epsilon(D_{nn'})$ generally correspond to color pattern variation indicative of a pattern flaw. The $\epsilon(R_n)$, $\epsilon(G_n)$, and $\epsilon(B_n)$ positive standard errors generally correspond to color shifts. The largest positive standard error for the inspection image is identified as ERR. Conditional 520 corresponds to a test of whether ERR exceeds a flaw threshold value, $ERR_0$, indicative of a pattern flaw or color shift flaw. If there is such a failure, then control passes to stage 522 to describe this flaw. The type of test value associated with ERR and the associated region or regions may be identified and highlighted as part of stage 522 to visually identify the flaw on a displayed inspection image. Control then flows onto stage 516 to fail the part and return to the beginning of the loop at stage 504.

If no color shifts or pattern flaws are detected in conditional 520, then control flows to reference image inspection in stage 524. For reference image inspection, the inspection image is used to generate a positive standard error image $E_{cxy}=abs(q_{cx'y'}-\mu_{cxy})/\sigma_{cxy}$, where $\mu_{cxy}$ and $\sigma_{cxy}$ are the average and error images, x' and y' are calculated in accordance with the transformation described in connection with the reference image determination in phase B training 140, and it is understood the $E_{cxy}=0$ if pixel (x', y'), is invalid (i.e., it is not the case that $0 \leq x' \leq 239$ and $0 \leq y' \leq 238$). The function abs( ) returns the absolute value of the argument. The transformation values x', y' are used to superimpose the image qcxy onto the reference image.

Next, all pixels for which $E_{cxy} > $ a pre-set threshold $E_1$ are flagged as bad pixels. Then, a number of bonds are determined between bad pixels—where a bond is defined as the side where two adjacent pixels touch. In correspondence with conditional 526, if the number of bad pixel bonds exceeds a threshold Z, then the bad pixels of the part image are highlighted in stage 528—such as blinking the bad pixels or setting them to a designated color in a displayed image. The part is subsequently failed in stage 516 before returning control to stage 504 to await inspection of the next part. On the other hand, if the number of bad pixels determined during reference image inspection stage 524 does not exceed Z as tested in conditional 526, then control flows to stage 530 and the part is deemed acceptable. Control then loops back to stage 504 to await the next part for inspection. Alternatively, an operator or external signal (not shown) may be used to halt inspection 150.

Notably, sorter 60 may be controlled by processor 40 in response to a failed part at stage 516 as shown in FIG. 8. Also, in other embodiments, a number of levels of deviation or variation of a part image may be determined to sort the parts into two or more acceptable or defective classes. In other words, more than two classes of parts could result from the inspection 150.

In still other embodiments, it is contemplated that various operations, stages, conditionals, procedures, thresholds, and processes described in connection with the present invention could be altered, rearranged, substituted, deleted, duplicated, combined, or added to other processes as would occur to those skilled in the art without departing from the spirit of the present invention.

As used herein, the terms "image," "region" of an image, "pixel," "color," "pattern" and "coloration" refer not only to visibly detectable items or qualities, but also to any representation of these items or qualities as one or more signals, values, constants, variables, or any other identifiable representation utilized by a processor, controller, or other processing equipment. Furthermore it should be be appreciated that as used herein: "variable," "value," "buffer," "constant," "flag," "threshold," "pixel," "image" (or a region thereof), "matrix," "input," "output," "command," or "memory location" each generally correspond to one or more signals within processing equipment of the present invention.

All publications, patents, and patent applications cited in this specification are herein incorporated by reference as if each individual publication, patent, or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of inspecting a multicolor pattern on an item with a processor and an imaging device, comprising:
   (a) moving the item by the imaging device to generate a number of image signals corresponding to the multicolor pattern;
   (b) correlating each of a number of regions of the multicolor pattern to one of a number of reference color values with the processor using the image signals;
   (c) modeling the multicolor pattern by deriving a number of test value sets with the processor each corresponding to one of the regions, each set having a first value representative of a first characteristic of a corresponding region and a second value representative of a second characteristic of the corresponding region; and
   (d) comparing the sets to reference data with the processor to detect variation of the multicolor pattern.

2. The method of claim 1, wherein the first value is determined as a function of a color space first moment of the corresponding region.

3. The method of claim 1, wherein the first value is determined as a function of a physical space first moment of the corresponding region.

4. The method of claim 1, wherein the first value is determined as a function of a principal radius of gyration of the corresponding region.

5. The method of claim 1, further comprising repeating steps (a) through (d) at least one time per second, each repetition corresponding to inspection of a different item.

6. The method of claim 1, further comprising a segmented image of the multicolor pattern.

7. The method of claim 1, further comprising:
   (e) establishing a first set of color values with the processor as a function of a number of color space coordinates;

(f) determining a second set of color values with the processor from a sample item as a function of the coordinates;

(g) generating the reference color values as a function of a corresponding one of a number of color pairs, each pair having a first member from the first set and a second member from the second set, the first member being closer in color space to the second member than any other color of the second set, the second member being closer in color space to the first member than any other color of the first set.

8. The method of claim 1, further comprising repeating steps (a) through (d) more than five times per second.

9. The method of claim 1 wherein generating the image signals comprises shuttering.

10. The method of claim 9 wherein the shuttering is accomplished by electronic gating of a camera.

11. The method of claim 9 wherein the shuttering is accomplished by strobing an illumination source.

12. The method of claim 9 wherein the shuttering is accomplished by using a dedicated mechanical device.

13. The method of claim 9 wherein the shuttering comprises selectively triggering a camera.

14. The method of claim 1 further comprising rejecting defective parts based on the comparing.

15. A system for inspecting a multicolor pattern on an item with a number of model data sets, comprising;

a conveying means configured to convey the item;

an imaging device positioned along said conveyor, said imaging device being configured to provide a number of image signals corresponding to the multicolor pattern of the item moving relative to said imaging device on said conveying means;

a processor with a memory, said processor being responsive to said image signals to store a number of pixels in said memory corresponding to an image of the multicolor pattern, each of said pixels having a color value;

said processor being configured to correlate the color value of each of said pixels to one of a number of model color values to identify a number of pixel groups with a uniform model color value;

said processor being configured to derive a number of test value sets each corresponding to one of said groups, each set having a number of values each corresponding to a different characteristic of a corresponding group, said test value sets being sized to occupy less memory space than said pixels and being independent of orientation of the multicolor pattern;

said processor being configured to generate an output signal corresponding to a multicolor pattern variation detected by comparing said test value sets to the model data sets; and an output device responsive to said output signal to indicate said defect.

16. The system of claim 15, wherein said output device includes a display configured to present an image of the multicolor pattern and an indicator to highlight said variation.

17. The system of claim 15, further comprising a sensor coupled to said imaging device to provide a signal corresponding to presence of the item in a field of view of said imaging device.

18. The system of claim 15, wherein said processor includes a means for detecting a defectively colored portion of the multicolor pattern, said portion having a color distinct from any desired color of any part of the multicolor pattern.

19. The system of claim 15, wherein said test value sets are sized to occupy no more than 5% of a memory space occupied by said pixels and at least one of said values is determined as a function of at least one of:

a color space first moment of the corresponding group;

a physical space centroid of the corresponding group;

an inter-centroid distance associated with the corresponding group; and a principal radius of gyration of the corresponding group.

20. The system of claim 15, wherein said processor includes a means to rotationally correlate a randomly oriented image of the multicolor pattern to orientation of a model image of the multicolor pattern.

21. The system of claim 18, wherein said output device includes a sorter configured to separate the item from a number of other items on said conveying means in response to an output signal from said processor.

22. The system of claim 15 wherein the system includes means for shuttering.

23. The system of claim 22 wherein the shuttering means comprises an electronically-gated charge coupled device.

24. The system of claim 22 wherein the shuttering means comprises a strobed illumination source.

25. The system of claim 22 wherein the shuttering means comprises a dedicated mechanical shuttering device.

26. The system of claim 22 wherein the shuttering means comprises means for selectively triggering the imaging device.

27. The system of claim 15 wherein the output device comprises a sorter for rejecting items having defects based on the output signal.

28. A method of inspection of a multicolor pattern on an item with a processor, comprising:

(a) establishing a first set of color values with the processor as a function of a number of color space coordinates;

(b) determining a second set of color values with the processor from a first sample as a function of the coordinates;

(c) generating a number of reference colors each being determined from a corresponding one of a number of color pairs, each pair having a first member from the first set and a second member from the second set, the first member being closer in color space to the second member than any other color of the second set, the second member being closer in color space to the first member than any other color of the first set; and (d) comparing a number of detected color values corresponding to the multicolor pattern to the reference color values with the processor to evaluate the multicolor pattern on the item.

29. The method of claim 28, wherein (d) includes displaying the image with an indication of a detected defect.

30. The method of claim 28, wherein the reference color values are included in a segmentation look up table in the processor.

31. The method of claim 28, wherein the first set is determined from a number of samples of the multicolor pattern by the processor.

32. The method of claim 28, wherein each of the reference colors is determined as a function of averaging the first member and the second member from the corresponding one of the number of color pairs.

33. The method of claim 28, further comprising:

(e) determining a third set of color values within the processor from a second sample as a function of the coordinates; and (f) pairing the reference color values to the third set of color values to update the reference colors.

34. The method of claim 28, wherein the processor includes a model image of the multicolor pattern, and further comprising:
(e) generating an observed image of the multicolor pattern, the observed image being randomly oriented in relation to the model image;
(f) characterizing the observed image by determining a number of image values each corresponding to one of a number of rotational positions about an image point, each of the image values being determined as a function of an optical property of a portion of the observed image at each of the rotational positions;
(g) rotationally correlating the item image to the model image as a function of the image values; and
(h) displaying the model image after rotational correlation.

35. The method of claim 28, further comprising repeating steps (a) through (d) more than five times per second.

36. The method of claim 28 further comprising generating image signals using an imaging device.

37. The method of claim 36 wherein the generating comprises shuttering by one of electronic gating of the imaging device, strobing of an illumination device, using a dedicated mechanical device, and selectively triggering the imaging device.

38. The method of claim 28 further comprising rejecting defective parts based on the comparing.

39. A method of inspecting a multicolor pattern on an item with a processor and an imaging device having a field of view, comprising:
(a) generating a number of image signals corresponding to the multicolor pattern of the item which is disposed in the field of view of the imaging device by relative movement of the item and the imaging device;
(b) correlating each of a number of regions of the multicolor pattern to one of a number of reference color values with the processor using the image signals;
(c) modeling the multicolor pattern by deriving a number of test value sets with the processor each corresponding to one of the regions, each set having a first value representative of a first characteristic of a corresponding region and a second value representative of a second characteristic of the corresponding region; and,
(d) comparing the sets to reference data with the processor to detect variation of the multicolor pattern.

40. A system for inspecting a multicolor pattern on an item with a number of model data sets, comprising;
an imaging device having a field of view, said imaging device being configured to provide a number of image signals corresponding to the multicolor pattern of the item which is disposed in the field of view by relative movement of the item and said imaging device;
a processor with a memory, said processor being responsive to said image signals to store a number of pixels in said memory corresponding to an image of the multicolor pattern, each of said pixels having a color value;
said processor being configured to correlate the color value of each of said pixels to one of a number of model color values to identify a number of pixel groups with a uniform model color value;
said processor being configured to derive a number of test value sets each corresponding to one of said groups, each set having a number of values each corresponding to a different characteristic of a corresponding group, said test value sets being sized to occupy less memory space than said pixels and being independent of orientation of the multicolor pattern;
said processor being configured to generate an output signal corresponding to a multicolor pattern variation detected by comparing said test value sets to the model data sets; and,
an output device responsive to said output signal to indicate said defect.

* * * * *